US012810470B2

(12) United States Patent
S Deyagond et al.

(10) Patent No.: US 12,810,470 B2
(45) Date of Patent: Nov. 24, 2026

(54) SYSTEM AND METHOD FOR ESTIMATING OBJECT DISTANCE AND/OR ANGLE FROM AN IMAGE CAPTURE DEVICE

(71) Applicant: Becton, Dickinson and Company, Franklin Lakes, NJ (US)

(72) Inventors: Sagar S Deyagond, Vijayapura (IN); Ashley Rachel Rothenberg, Morris Plains, NJ (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 0 days.

(21) Appl. No.: 18/994,240

(22) PCT Filed: Jul. 25, 2023

(86) PCT No.: PCT/US2023/028522
§ 371 (c)(1),
(2) Date: Jan. 14, 2025

(87) PCT Pub. No.: WO2024/025851
PCT Pub. Date: Feb. 1, 2024

(65) Prior Publication Data

US 2026/0017825 A1 Jan. 15, 2026

Related U.S. Application Data

(60) Provisional application No. 63/441,031, filed on Jan. 25, 2023.

(30) Foreign Application Priority Data

Jul. 26, 2022 (IN) ............................ 202211042859

(51) Int. Cl.
*G06T 7/80* (2017.01)
*G06T 7/55* (2017.01)
*G06T 7/60* (2017.01)

(52) U.S. Cl.
CPC .................. *G06T 7/80* (2017.01); *G06T 7/55* (2017.01); *G06T 7/60* (2013.01); *G06T 2207/30004* (2013.01); *G06T 2207/30204* (2013.01)

(58) Field of Classification Search
CPC ................ G06T 7/80; G06T 7/55; G06T 7/60
See application file for complete search history.

(56) References Cited

U.S. PATENT DOCUMENTS 7,853,038 B2 * 12/2010 Lee .......................... G06T 7/60 382/106
9,171,211 B2 10/2015 Keat et al.
(Continued)

FOREIGN PATENT DOCUMENTS

AU 2020219832 A1 8/2021
CN 114324078 A 4/2022

OTHER PUBLICATIONS

Hassaballah et al. "Image Features Detection, Description and Matching" (2016) From Spec.
(Continued)

*Primary Examiner* — Mishawn N. Hunter
(74) *Attorney, Agent, or Firm* — The Webb Law Firm

(57) ABSTRACT

A system and method for estimating object distance and/or angle from an image capture device may obtain an image including a fiducial marker captured by an image capture device; extract a pixel width and/or a pixel height of the fiducial marker in the image space of the image; determine, based on the pixel width and/or the pixel height, a known width and/or a known height, and one or more calibration parameters, a distance of the fiducial marker from the image capture device; estimate, based on the pixel width, the pixel height, the known width, and the known height, a yaw angle of the fiducial marker with respect to the image capture device; determine, based on a slope of a positional vector of
(Continued)

the fiducial marker, a roll angle of the fiducial marker with respect to the image capture device; and/or provide the distance, the yaw angle, and/or the roll angle.

16 Claims, 24 Drawing Sheets

(56) References Cited

U.S. PATENT DOCUMENTS

| | | | | |
|---|---|---|---|---|
| 9,557,161 | B2 | 1/2017 | Bae et al. | |
| 9,862,318 | B2 | 1/2018 | Lessmann et al. | |
| 9,902,341 | B2 * | 2/2018 | Oshima | G06T 3/4038 |
| 10,460,473 | B1 | 10/2019 | McMichael et al. | |
| 10,799,109 | B2 | 10/2020 | Carrafa et al. | |
| 2010/0073488 | A1 * | 3/2010 | Murase | G06T 11/60 348/207.1 |
| 2011/0305376 | A1 | 12/2011 | Neff | |
| 2012/0075343 | A1 | 3/2012 | Chen et al. | |
| 2012/0242851 | A1 | 9/2012 | Fintel et al. | |
| 2014/0029796 | A1 | 1/2014 | Fiorini et al. | |
| 2015/0071524 | A1 | 3/2015 | Lee | |
| 2015/0209113 | A1 | 7/2015 | Burkholz et al. | |
| 2017/0019657 | A1 | 1/2017 | Livyatan et al. | |
| 2017/0169604 | A1 | 6/2017 | Van der Zwan et al. | |
| 2018/0183986 | A1 | 6/2018 | Smith et al. | |
| 2018/0338126 | A1 | 11/2018 | Trevor et al. | |
| 2019/0076200 | A1 | 3/2019 | Barnett et al. | |
| 2019/0180467 | A1 | 6/2019 | Li et al. | |
| 2019/0329407 | A1 | 10/2019 | Qi et al. | |
| 2019/0364206 | A1 | 11/2019 | Dal Mutto et al. | |
| 2019/0394360 | A1 * | 12/2019 | Zunjarrao | H04N 23/81 |
| 2020/0159313 | A1 | 5/2020 | Gibby et al. | |
| 2020/0364482 | A1 | 11/2020 | Bradski et al. | |
| 2021/0207957 | A1 | 7/2021 | Haeusler et al. | |
| 2021/0209782 | A1 | 7/2021 | Fang et al. | |
| 2021/0318850 | A1 | 10/2021 | Thomas | |
| 2022/0277489 | A1 * | 9/2022 | Ali | G06N 3/0464 |

OTHER PUBLICATIONS

Addison, “How to Perform Pose Estimation Using an ArUco Marker”, Dec. 22, 2021, pp. 1-14, XP093342425, Retrieved from the Internet: URL: https://automaticaddision.com/how-to-perform-estimation-using-an-aruco-marker/ [retrieved on Dec. 1, 2025].

Rosebrock, “Find distance from camera to object using Python and OpenCV”, XP055925999, Retrieved from the Internet: URL:https://pyimagesearch.com/2015/01/19/find-distance-camera-objectmarker-using-python-opencv/ [retrieved on May 30, 2022], Jul. 8, 2021, 111 pages.

Sadekar, “Introduction to Epipolar Geometry and Stereo Vision”, XP093341488, Retrieved from the Internet: URL: https://learnopencv.com/introduction-to-epipolar-geometry-and-stereo-vision/, [retrieved on Oct. 28, 2025], Dec. 28, 2020, 12 pages.

* cited by examiner

| | LUMEN ADAPTER | DISTAL END OF EXT SET | PROXIMAL END EXT SET | NEEDLESS CONNECTOR | DISTAL END OF TUBING SET | DISTAL TUBING SET Y SITE | PROXIMAL TUBING SET TAG | DISINFECTANT CAP | DRESSING TAG | PUMP TAG |
|---|---|---|---|---|---|---|---|---|---|---|
| LUMEN ADAPTER | | | | | WITHOUT NEEDLESS CONNECTOR | | | WITHOUT NEEDLESS CONNECTOR | | |
| DISTAL END OF EXT SET | | | | | | | | | | |
| PROXIMAL END EXT SET | | IT MIGHT BE CONNECTED TO SECOND EXT SET | | | WITHOUT NEEDLESS CONNECTOR | | | | | |
| NEEDLESS CONNECTOR | | | | VERY UNLIKELY TO HAPPEN | | | | | | |
| DISTAL END OF TUBING SET | | | ALWAYS NEEDS NC | | | | | | | |
| DISTAL TUBING SET Y SITE | | | | VERY UNLIKELY TO HAPPEN | IT MIGHT BE CONNECTED TO SECOND TUBING SET | | | | | |
| PROXIMAL TUBING SET TAG | | | | | | | | | | |
| DISINFECTANT CAP | | | WILL NEEDS NC | | | | | | | |
| DRESSING TAG | NEEDS FURTHER DISCUSSION | | | | | | | | | |
| PUMP TAG | | | | | | | | | | |
| | | | | | | | | | | |
| | | | | | | | | | | |
| LEGEND | | | | | | | | | | |
| | | CAN'T BE CONNECTED WITH IT OR CAN NOT BE CONNECTED | | | | | | | | |
| | | CAN BE CONNECTED (FOR ALL CATHETER TYPES)–(PROBABLE) | | | | | | | | |
| | | RIGID CONNECTOR (FOR ONE DEVICE) AND REGULAR CONNECTION FOR TWO DEVICES (SERIAL CONNECTION) | | | | | | | | |
| | | UNLIKELY CONNECTIONS (THEY ARE POSSIBLE CONNECTIONS TO CONSIDER WITH LESS LIKELY HOOD OF HAPPENING) | | | | | | | | |

FIG. 9

SYSTEM UNDERSTANDS FULL TREE PARTS FROM PUMP TO DRESSING

1400

SYSTEM AND METHOD FOR ESTIMATING OBJECT DISTANCE AND/OR ANGLE FROM AN IMAGE CAPTURE DEVICE

CROSS-REFERENCE TO RELATED APPLICATIONS

This application is the United States national phase of International Application No. PCT/US23/28522 filed Jul. 25, 2023, and claims priority to U.S. Provisional Application No. 63/441,031 entitled "System and Method for Estimating Object Distance and/or Angle from an Image Capture Device" filed Jan. 25, 2023, and Indian Provisional Patent Application No. 202211042859 entitled "System and Method for Vascular Access Management", filed Jul. 26, 2022, the disclosures of which are hereby incorporated by reference in their entireties.

TECHNICAL FIELD

Provided are improved systems, devices, products, apparatus, and/or methods for estimating object distance and/or angle from an image capture device.

BACKGROUND

A goal of computer vision may be finding attributes of an identified object, such as shape, color, distance from a viewing plane, and angle of orientation, and/or the like.

A dynamic monocular camera used in a handheld manner for image capture may lead to some loss of region of interest (ROI) due to a distance between the camera and interested objects in a field-of-view (FOV) of the camera. For example, distance estimation may be used in certain dynamic environments for identifying an accurate FOV for capturing image information from the camera.

Objects have three dimensions of rotational movement: pitch, yaw, and roll, and these movements arise out of movement of the objects and/or the camera. Existing systems for calculating yaw and roll angles of an object consume significant processing resources and time for calculation.

SUMMARY

Accordingly, provided are improved systems, devices, products, apparatus, and/or methods for estimating object distance and/or angle from an image capture device.

According to some non-limiting embodiments or aspects, provided is a system, including: at least one processor coupled to a memory and programmed and/or configured to: obtain a calibration image including a calibration marker, wherein the calibration image including the calibration marker is captured by an image capture device with the calibration marker located at a known distance from the image capture device, and wherein the calibration marker has a known dimension; extract one or more features associated with the calibration marker in an image space of the calibration image; determine, based on the one or more features associated with the calibration marker in the image space of the calibration image, the known distance of the calibration marker from the image capture device, and the known dimension of the calibration marker, one or more calibration parameters; obtain an image including an object, wherein the image including the object is captured by the image capture device; extract at least one feature associated with the object in an image space of the image; obtain a dimension of the object; determine, based on the at least one feature associated with the object in the image space of the image, the dimension of the object, and the one or more calibration parameters, the distance of the object from the image capture device; and provide the distance of the object from the image capture device.

In some non-limiting embodiments or aspects, the one or more features associated with the calibration marker in the image space of the calibration image include a pixel dimension of the calibration marker in the image space of the calibration image.

In some non-limiting embodiments or aspects, the one or more calibration parameters include an effective focal length associated with the image capture device, wherein the effective focal length is determined according to the following Equation:

$$F = (P \times D) / W$$

where F is the effective focal length, P is the pixel dimension of the calibration marker in the image space of the calibration image, D is the known distance of the calibration marker from the image capture device, and W is the known dimension of the calibration marker.

In some non-limiting embodiments or aspects, the at least one feature associated with the object in the image space of the image includes a pixel dimension of the object in the image space of the image.

In some non-limiting embodiments or aspects, the at least one processor is programmed and/or configured to obtain the dimension of the object by: storing, in a memory, a plurality of dimensions associated with a plurality of types of objects; determining, based on the image, a type of the object; and determining, based on the type of the object, the dimension of the object from the plurality of dimensions associated with the plurality of types of objects.

In some non-limiting embodiments or aspects, the at least one processor is programmed and/or configured to obtain the dimension of the object by estimating, based on a number of pixels associated with the object in the image, a known dimension of at least one other object, and a number of pixels associated with the at least one other object in the image, the dimension of the object.

In some non-limiting embodiments or aspects, the at least one processor is programmed and/or configured to determine the distance of the object from the image capture device according to the following Equation:

$$D' = (W' \times F) / P'$$

where D' is the distance of the object from the image capture device, W' is the dimension of the object, F is the effective focal length, and P' is the pixel dimension of the object in the image space of the image.

In some non-limiting embodiments or aspects, the at least one processor is programmed and/or configured to provide the distance of the object from the image capture device by displaying, on a display, the distance of the object from the image capture device concurrently with the image including the object.

In some non-limiting embodiments or aspects, the at least one processor is programmed and/or configured to provide the distance of the object from the image capture device by using the distance of the object from the image capture device to determine whether the object is connected to another object in the image.

In some non-limiting embodiments or aspects, the at least one processor is programmed and/or configured to obtain the image including the object by: obtaining a first image including the object captured by the image capture device at a first angle relative to the object; obtaining a second image including the object captured by the image capture device at a second angle relative to the object different than the first angle, wherein the at least one processor is programmed and/or configured to extract the at least one feature associated with the object in the image space of the image by: detecting, using an image feature detector algorithm, a plurality of first interest points associated with the object in the first image and a plurality of second interest points associated with the object in the second image; generating, using an image feature descriptor algorithm, a plurality of first descriptor vectors associated with the plurality of first interest points and a plurality of second descriptor vectors associated with the plurality of second interest points; matching, using a feature matching algorithm, based on the plurality of first descriptor vectors associated with the plurality of first interest points and the plurality of second descriptor vectors associated with the plurality of second interest points, at least one first interest point of the plurality of first interest points to at least one second interest point of the plurality of second interest points; and determining, based on the at least one first interest point of the plurality of first interest points matched to at least one second interest point of the plurality of second interest points, position information associated with a three-dimensional (3D) position of the object relative to the image capture device.

According to some non-limiting embodiments or aspects, provided is a method, including: calibrating an image capture device by: capturing, with the image capture device, with a calibration marker having a known dimension located at a known distance from the image capture device, a calibration image including the calibration marker; extracting, with at least one processor, one or more features associated with the calibration marker in an image space of the calibration image; determining, with the at least one processor, based on the one or more features associated with the calibration marker in the image space of the calibration image, the known distance of the calibration marker from the image capture device, and the known dimension of the calibration marker, one or more calibration parameters; and estimating a distance of an object from the image capture device by: capturing, with the image capture device, an image including the object; extracting, with the at least one processor, at least one feature associated with the object in an image space of the image; obtaining, with the at least one processor, a dimension of the object; determining, with the at least one processor, based on the at least one feature associated with the object in the image space of the image, the dimension of the object, and the one or more calibration parameters, the distance of the object from the image capture device; and providing, with the at least one processor, the distance of the object from the image capture device.

In some non-limiting embodiments or aspects, the one or more features associated with the calibration marker in the image space of the calibration image include a pixel dimension of the calibration marker in the image space of the calibration image.

In some non-limiting embodiments or aspects, the one or more calibration parameters include an effective focal length associated with the image capture device, wherein the effective focal length is determined according to the following Equation:

$$F = (P \times D) / W$$

where F is the effective focal length, P is the pixel dimension of the calibration marker in the image space of the calibration image, D is the known distance of the calibration marker from the image capture device, and W is the known dimension of the calibration marker.

In some non-limiting embodiments or aspects, the at least one feature associated with the object in the image space of the image includes a pixel dimension of the object in the image space of the image.

In some non-limiting embodiments or aspects, obtaining the dimension of the object includes: storing, in a memory, a plurality of dimensions associated with a plurality of types of objects; determining, based on the image, a type of the object; and determining, based on the type of the object, the dimension of the object from the plurality of dimensions associated with the plurality of types of objects.

In some non-limiting embodiments or aspects, obtaining the dimension of the object includes estimating, based on a number of pixels associated with the object in the image, a known dimension of at least one other object, and a number of pixels associated with the at least one other object in the image, the dimension of the object.

In some non-limiting embodiments or aspects, the distance of the object from the image capture device is determined according to the following Equation:

$$D' = (W' \times F) / P'$$

where D' is the distance of the object from the image capture device, W' is the dimension of the object, F is the effective focal length, and P' is the pixel dimension of the object in the image space of the image.

In some non-limiting embodiments or aspects, providing the distance of the object from the image capture device includes at least one of: displaying, on a display, the distance of the object from the image capture device concurrently with the image including the object; using the distance of the object from the image capture device to determine whether the object is connected to another object in the image; or any combination thereof.

In some non-limiting embodiments or aspects, capturing, with the image capture device, the image including the object includes: capturing with the image capture device, a first image including the object at a first angle relative to the object; capturing, with the image capture device, a second image including the object at a second angle relative to the object different than the first angle, wherein extracting, with the at least one processor, the at least one feature associated with the object in the image space of the image includes: detecting, using an image feature detector algorithm, a plurality of first interest points associated with the object in the first image and a plurality of second interest points associated with the object in the second image; generating, using an image feature descriptor algorithm, a plurality of first descriptor vectors associated with the plurality of first interest points and a plurality of second descriptor vectors associated with the plurality of second interest points;

matching, using a feature matching algorithm, based on the plurality of first descriptor vectors associated with the plurality of first interest points and the plurality of second descriptor vectors associated with the plurality of second interest points, at least one first interest point of the plurality of first interest points to at least one second interest point of the plurality of second interest points; and determining, based on the at least one first interest point of the plurality of first interest points matched to at least one second interest point of the plurality of second interest points, position information associated with a three-dimensional (3D) position of the object relative to the image capture device.

According to some non-limiting embodiments or aspects, provided is a computer program product comprising at least one non-transitory computer-readable medium including program instructions that, when executed by at least one processor, cause the at least one processor to: obtain a calibration image including a calibration marker, wherein the calibration image including the calibration marker is captured by an image capture device with the calibration marker located at a known distance from the image capture device, and wherein the calibration marker has a known dimension; extract one or more features associated with the calibration marker in an image space of the calibration image; determine, based on the one or more features associated with the calibration marker in the image space of the calibration image, the known distance of the calibration marker from the image capture device, and the known dimension of the calibration marker, one or more calibration parameters; obtain an image including an object, wherein the image including the object is captured by the image capture device; extract at least one feature associated with the object in an image space of the image; obtain a dimension of the object; determine, based on the at least one feature associated with the object in the image space of the image, the dimension of the object, and the one or more calibration parameters, the distance of the object from the image capture device; and provide the distance of the object from the image capture device.

According to some non-limiting embodiments or aspects, provided is a system, including: at least one processor coupled to a memory and programmed and/or configured to: obtain an image including a fiducial marker captured by an image capture device, wherein the fiducial marker has a known width and a known height; extract a pixel width and a pixel height of the fiducial marker in the image space of the image; estimate, based on the pixel width, the pixel height, and the known width, and the known height, a yaw angle of the fiducial marker with respect to the image capture device; and provide the yaw angle of the fiducial marker with respect to the image capture device.

In some non-limiting embodiments or aspects, the at least one processor is programmed and/or configured to estimate the yaw angle of the fiducial marker with respect to the image capture device according to the following Equation:

$$\text{Yaw Angle} = \alpha * \beta$$

where β is a multiplying factor, and α is determined according to the following Equation:

$$\alpha = ((w_k/h_k) - (w_p/h_p)) * 90$$

where $w_k$ is the known width of the fiducial marker, $h_k$ is the known height of the fiducial marker, $w_p$ is the pixel width of the fiducial marker in the image space of the image, and $h_p$ is the pixel height of the fiducial marker in the image space of the image.

In some non-limiting embodiments or aspects, the multiplying factor β is determined from a plurality of pre-stored multiplying factors according to a ratio of the pixel width $w_p$ to the pixel height $h_p$.

In some non-limiting embodiments or aspects, a ratio of the known width of the fiducial marker $w_k$ to the known height $h_k$ of the fiducial marker is one-to-one.

In some non-limiting embodiments or aspects, the fiducial marker includes an AprilTag.

According to some non-limiting embodiments or aspects, provided is a method, including: obtaining, with at least one processor, an image including a fiducial marker captured by an image capture device, wherein the fiducial marker has a known width and a known height; extracting, with at least one processor, a pixel width and a pixel height of the fiducial marker in the image space of the image; estimating, with at least one processor, based on the pixel width, the pixel height, and the known width, and the known height, a yaw angle of the fiducial marker with respect to the image capture device; and providing, with the at least one processor, the yaw angle of the fiducial marker with respect to the image capture device.

In some non-limiting embodiments or aspects, the at least one processor estimates the yaw angle of the fiducial marker with respect to the image capture device according to the following Equation:

$$\text{Yaw Angle} = \alpha * \beta$$

where β is a multiplying factor, and α is determined according to the following Equation:

$$\alpha = ((w_k/h_k) - (w_p/h_p)) * 90$$

where $w_k$ is the known width of the fiducial marker, $h_k$ is the known height of the fiducial marker, $w_p$ is the pixel width of the fiducial marker in the image space of the image, and $h_p$ is the pixel height of the fiducial marker in the image space of the image.

In some non-limiting embodiments or aspects, the multiplying factor β is determined from a plurality of pre-stored multiplying factors according to a ratio of the pixel width $w_p$ to the pixel height $h_p$.

In some non-limiting embodiments or aspects, a ratio of the known width of the fiducial marker $w_k$ to the known height $h_k$ of the fiducial marker is one-to-one.

In some non-limiting embodiments or aspects, the fiducial marker includes an AprilTag.

According to some non-limiting embodiments or aspects, provided is a system, including: at least one processor coupled to a memory and programmed and/or configured to: obtain an image including a fiducial marker captured by an image capture device, wherein the fiducial marker has a known width and a known height; extract a centroid of the fiducial marker in an image space of the image; determine, based on the centroid, the known width, and the known height, a positional vector of the fiducial marker; determine a slope of the positional vector of the fiducial marker with respect to a coordinate base axis of the image; determine, based on the slope of the positional vector of the fiducial marker with respect to the coordinate base axis of the image, a roll angle of the fiducial marker with respect to the image capture device; and provide the roll angle of the fiducial marker with respect to the image capture device.

In some non-limiting embodiments or aspects, the at least one processor is programmed and/or configured to estimate the slope of the positional vector of the fiducial marker with respect to the coordinate base axis of the image according to the following Equation:

$$\text{Slope} = (y2 - y1)/(x2 - x1)$$

where x1, y1 are coordinates of a first point at a first end of the positional vector, and x2, y2 are coordinates of a second point at a second end of the positional vector.

In some non-limiting embodiments or aspects, the at least one processor is programmed and/or configured to determine, based on the slope of the positional vector of the fiducial marker with respect to the coordinate base axis of the image, the roll angle of the fiducial marker with respect to the image capture device according to the following Equation:

$$\text{Roll Angle} = \tan^{1}(\text{Slope}).$$

In some non-limiting embodiments or aspects, the fiducial marker includes an AprilTag.

In some non-limiting embodiments or aspects, the centroid of the fiducial marker in the image space of the image includes an average of each point at each corner of the AprilTag, wherein the positional vector includes a sum of a difference of points on an axis of the image.

According to some non-limiting embodiments or aspects, provided is a method, including: obtaining, with at least one processor, an image including a fiducial marker captured by an image capture device, wherein the fiducial marker has a known width and a known height; extracting, with the at least one processor, a centroid of the fiducial marker in an image space of the image; determining, with the at least one processor, based on the centroid, the known width, and the known height, a positional vector of the fiducial marker; determining a slope of the positional vector of the fiducial marker with respect to a coordinate base axis of the image; determining, with the at least one processor, based on the slope of the positional vector of the fiducial marker with respect to the coordinate base axis of the image, a roll angle of the fiducial marker with respect to the image capture device; and providing, with the at least one processor, the roll angle of the fiducial marker with respect to the image capture device.

In some non-limiting embodiments or aspects, the at least one processor estimates the slope of the positional vector of the fiducial marker with respect to the coordinate base axis of the image according to the following Equation:

$$\text{Slope} = (y2 - y1)/(x2 - x1)$$

where x1, y1 are coordinates of a first point at a first end of the positional vector, and x2, y2 are coordinates of a second point at a second end of the positional vector.

In some non-limiting embodiments or aspects, the at least one processor determines, based on the slope of the positional vector of the fiducial marker with respect to the coordinate base axis of the image, the roll angle of the fiducial marker with respect to the image capture device according to the following Equation:

$$\text{Roll Angle} = \tan^{1}(\text{Slope}).$$

In some non-limiting embodiments or aspects, the fiducial marker includes an AprilTag.

In some non-limiting embodiments or aspects, the centroid of the fiducial marker in the image space of the image includes an average of each point at each corner of the AprilTag, wherein the positional vector includes a sum of a difference of points on an axis of the image.

According to some non-limiting embodiments or aspects, provided is a system, including: at least one processor coupled to a memory and programmed and/or configured to: obtain an image including a fiducial marker captured by an image capture device, wherein the fiducial marker has a known width and a known height; extract a pixel width and a pixel height of the fiducial marker in an image space of the image; determine, based on the pixel width and/or the pixel height, the known width and/or the known height, and one or more calibration parameters, a distance of the fiducial marker from the image capture device; estimate, based on the pixel width, the pixel height, the known width, and the known height, a yaw angle of the fiducial marker with respect to the image capture device; extract a centroid of the fiducial marker in the image space of the image; determine, based on the centroid, the known width, and the known height, a positional vector of the fiducial marker; determine a slope of the positional vector of the fiducial marker with respect to a coordinate base axis of the image; determine, based on the slope of the positional vector of the fiducial marker with respect to the coordinate base axis of the image, a roll angle of the fiducial marker with respect to the image capture device; and provide the distance of the fiducial marker from the image capture device, the yaw angle of the fiducial marker with respect to the image capture device, and the roll angle of the fiducial marker with respect to the image capture device.

In some non-limiting embodiments or aspects, the at least one processor is further programmed and/or configured to: obtain a calibration image including a calibration marker, wherein the calibration image including the calibration marker is captured by the image capture device with the calibration marker located at a known distance from the image capture device, and wherein the calibration marker has a known dimension; extract one or more features associated with the calibration marker in an image space of the calibration image; and determine, based on the one or more features associated with the calibration marker in the image space of the calibration image, the known distance of the calibration marker from the image capture device, and the known dimension of the calibration marker, the one or more calibration parameters.

In some non-limiting embodiments or aspects, the at least one processor is programmed and/or configured to provide the distance of the fiducial marker from the image capture device, the yaw angle of the fiducial marker with respect to the image capture device, and the roll angle of the fiducial marker with respect to the image capture device by displaying, on a display, concurrently with the image including the fiducial marker, the distance of the fiducial marker from the image capture device, the yaw angle of the fiducial marker with respect to the image capture device, and the roll angle of the fiducial marker with respect to the image capture device.

In some non-limiting embodiments or aspects, the at least one processor is programmed and/or configured to provide the distance of the fiducial marker from the image capture device, the yaw angle of the fiducial marker with respect to the image capture device, and the roll angle of the fiducial marker with respect to the image capture device by using the distance of the fiducial marker from the image capture device, the yaw angle of the fiducial marker with respect to the image capture device, and the roll angle of the fiducial marker with respect to the image capture device to determine whether a medical device associated with the fiducial marker is connected to another medical device in the image.

In some non-limiting embodiments or aspects, the fiducial marker includes an AprilTag.

According to some non-limiting embodiments or aspects, provided is a method, including: obtaining, with at least one processor, an image including a fiducial marker captured by an image capture device, wherein the fiducial marker has a known width and a known height; extracting, with the at least one processor, a pixel width and a pixel height of the fiducial marker in an image space of the image; determining, with the at least one processor, based on the pixel width and/or the pixel height, the known width and/or the known height, and one or more calibration parameters, a distance of the fiducial marker from the image capture device; estimating, with the at least one processor, based on the pixel width, the pixel height, the known width, and the known height, a yaw angle of the fiducial marker with respect to the image capture device; extracting, with the at least one processor, a centroid of the fiducial marker in the image space of the image; determining, with the at least one processor, based on the centroid, the known width, and the known height, a positional vector of the fiducial marker; determining, with the at least one processor, a slope of the positional vector of the fiducial marker with respect to a coordinate base axis of the image; determining, with the at least one processor, based on the slope of the positional vector of the fiducial marker with respect to the coordinate base axis of the image, a roll angle of the fiducial marker with respect to the image capture device; and providing, with the at least one processor, the distance of the fiducial marker from the image capture device, the yaw angle of the fiducial marker with respect to the image capture device, and the roll angle of the fiducial marker with respect to the image capture device.

In some non-limiting embodiments or aspects, the method further incudes: obtaining, with the at least one processor, a calibration image including a calibration marker, wherein the calibration image including the calibration marker is captured by the image capture device with the calibration marker located at a known distance from the image capture device, and wherein the calibration marker has a known dimension; extracting, with the at least one processor, one or more features associated with the calibration marker in an image space of the calibration image; and determining, with the at least one processor, based on the one or more features associated with the calibration marker in the image space of the calibration image, the known distance of the calibration marker from the image capture device, and the known dimension of the calibration marker, the one or more calibration parameters.

In some non-limiting embodiments or aspects, the at least one processor provides the distance of the fiducial marker from the image capture device, the yaw angle of the fiducial marker with respect to the image capture device, and the roll angle of the fiducial marker with respect to the image capture device by displaying, on a display, concurrently with the image including the fiducial marker, the distance of the fiducial marker from the image capture device, the yaw angle of the fiducial marker with respect to the image capture device, and the roll angle of the fiducial marker with respect to the image capture device.

In some non-limiting embodiments or aspects, the at least one processor provides the distance of the fiducial marker from the image capture device, the yaw angle of the fiducial marker with respect to the image capture device, and the roll angle of the fiducial marker with respect to the image capture device by using the distance of the fiducial marker from the image capture device, the yaw angle of the fiducial marker with respect to the image capture device, and the roll angle of the fiducial marker with respect to the image capture device to determine whether a medical device associated with the fiducial marker is connected to another medical device in the image.

In some non-limiting embodiments or aspects, the fiducial marker includes an AprilTag.

BRIEF DESCRIPTION OF THE DRAWINGS

Additional advantages and details are explained in greater detail below with reference to the exemplary embodiments that are illustrated in the accompanying schematic figures, in which:

FIG. 9 is a chart of example unlikely but possible connections between medical devices;

DETAILED DESCRIPTION

Figure 1A:
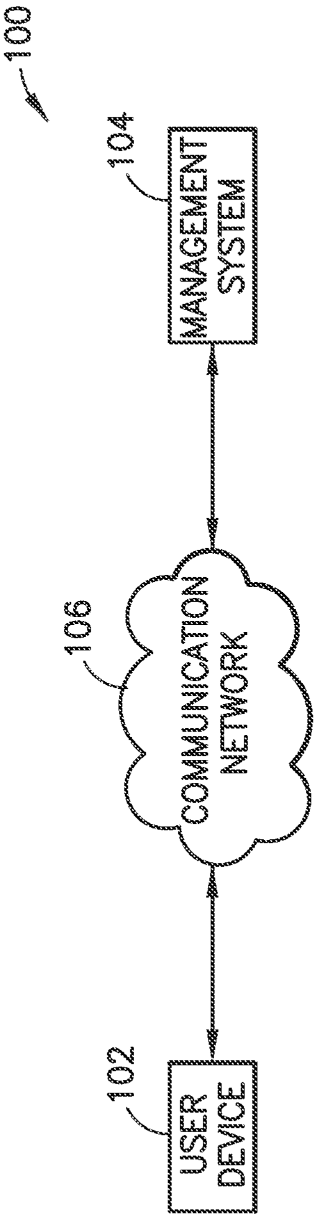
FIG. 1A is a diagram of non-limiting embodiments or aspects of an environment in which systems, devices, products, apparatus, and/or methods, described herein, can be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

For purposes of the description hereinafter, the terms "end," "upper," "lower," "right," "left," "vertical," "horizontal," "top," "bottom," "lateral," "longitudinal," and derivatives thereof shall relate to embodiments or aspects as they are oriented in the drawing figures. However, it is to be understood that embodiments or aspects may assume various alternative variations and step sequences, except where expressly specified to the contrary. It is also to be understood that the specific devices and processes illustrated in the attached drawings, and described in the following specification, are simply non-limiting exemplary embodiments or aspects. Hence, specific dimensions and other physical characteristics related to the embodiments or aspects of the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices that are configured to directly or indirectly communicate with or over one or more networks. A computing device may be a mobile or portable computing device, a desktop computer, a server, and/or the like. Furthermore, the term "computer" may refer to any computing device that includes the necessary components to receive, process, and output data, and normally includes a display, a processor, a memory, an input device, and a network interface. A "computing system" may include one or more computing devices or computers. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.). Further, multiple computers, e.g., servers, or other computerized devices directly or indirectly communicating in the network environment may constitute a "system" or a "computing system".

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Referring now to FIG. 1A, FIG. 1A is a diagram of an example environment 100 in which devices, systems, methods, and/or products described herein, may be implemented. As shown in FIG. 1A, environment 100 includes user device 102, management system 104, and/or communication network 106. Systems and/or devices of environment 100 can interconnect via wired connections, wireless connections, or a combination of wired and wireless connections.

Figure 1B:
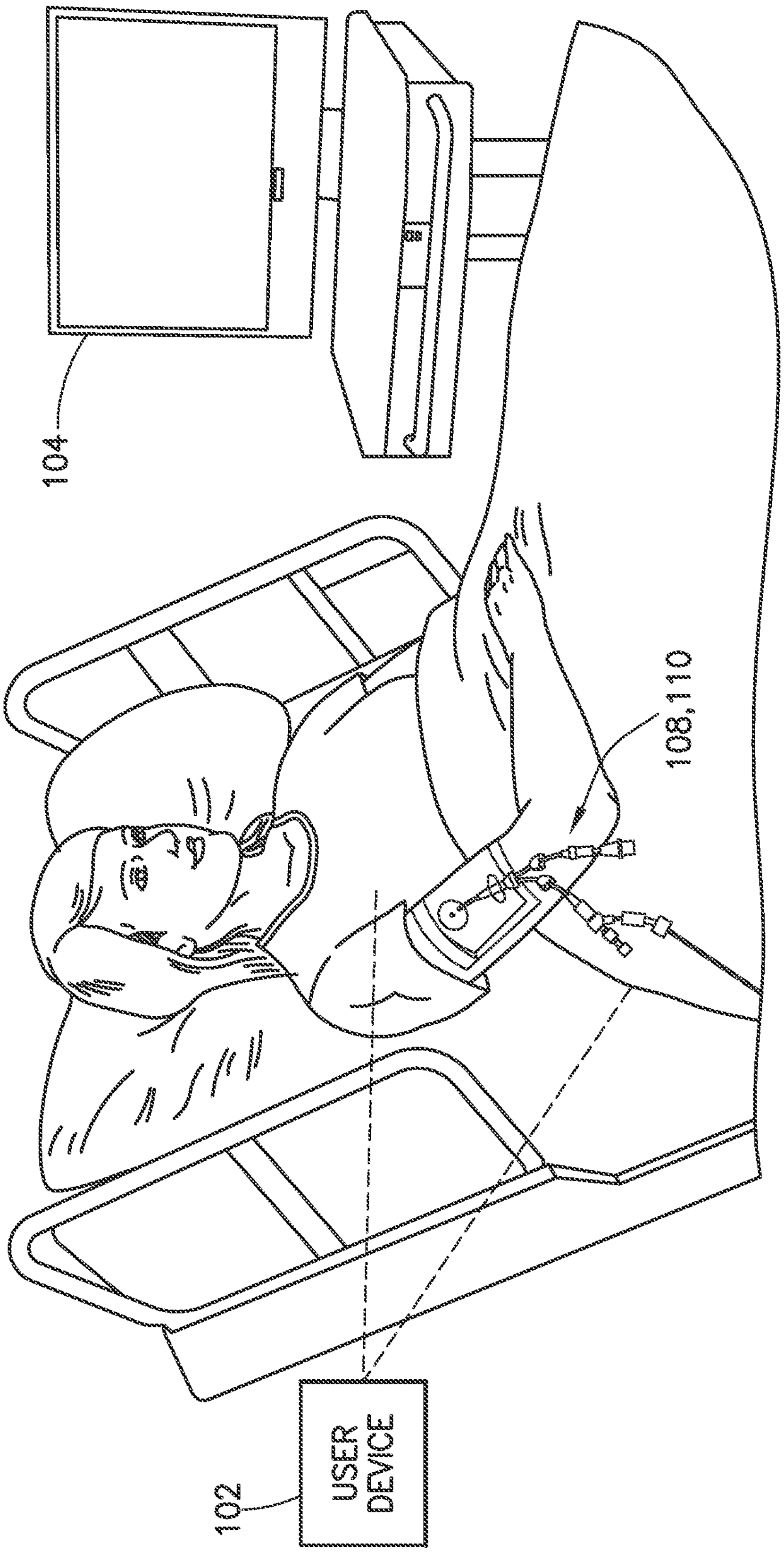
FIG. 1B is a diagram of non-limiting embodiments or aspects of an implementation of an environment in which systems, devices, products, apparatus, and/or methods, described herein, can be implemented.

Referring also to FIG. 1B, FIG. 1B is a diagram of non-limiting embodiments or aspects of an implementation of environment 100 in which systems, devices, products, apparatus, and/or methods, described herein, can be implemented. For example, as shown in FIG. 1B, environment 100 may include a hospital room including a patient, one or more medical devices 108, one or more fiducial markers 110 associated with the one or more medical devices 108, and/or a caretaker (e.g., a nurse, etc.).

User device 102 may include one or more devices capable of receiving information and/or data from management system 104 (e.g., via communication network 106, etc.) and/or communicating information and/or data to management system 104 (e.g., via communication network 106, etc.). For example, user device 102 may include one or more computing systems including one or more processors (e.g., one or more computing devices, one or more server computers, one or more mobile computing devices, one or more tablet computers, etc.). In some non-limiting embodiments or aspects, user device 102 may include a tablet computer or mobile computing device, such as an Apple® iPad, an Apple® iPhone, an Android® tablet, an Android® phone, and/or the like.

User device 102 may include one or more image capture devices (e.g., one or more cameras, one or more sensors, etc.) configured to capture one or more images of an environment (e.g., environment 100, etc.) surrounding the one or more image capture devices. For example, user device 102 may include one or more image capture devices configured to capture one or more images of the one or more medical devices 108, the one or more fiducial markers 110 associated with the one or more medical devices 108, and/or the patient. As an example, user device 102 may include a monocular camera.

Management system 104 may include one or more devices capable of receiving information and/or data from user device 102 (e.g., via communication network 106, etc.) and/or communicating information and/or data to user device 102 (e.g., via communication network 106, etc.). For example, management system 104 may include one or more computing systems including one or more processors (e.g., one or more computing devices, one or more server computers, one or more mobile computing devices, etc.). In some non-limiting embodiments or aspects, management system 104 includes and/or is accessible via a nurse station or terminal in a hospital. For example, management system 104 may provide bedside nurse support, nursing station manager support, retrospective reporting for nursing administration, and/or the like.

Communication network 106 may include one or more wired and/or wireless networks. For example, communication network 106 may include a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of systems and devices shown in FIGS. 1A and 1B are provided as an example. There can be additional systems and/or devices, fewer systems and/or devices, different systems and/or devices, or differently arranged systems and/or devices than those shown in FIGS. 1A and 1B. Furthermore, two or more systems or devices shown in FIGS. 1A and 1B can be implemented within a single system or a single device, or a single system or a single device shown in FIGS. 1A and 1B can be implemented as multiple, distributed systems or devices. Additionally, or alternatively, a set of systems or a set of devices (e.g., one or more systems, one or more devices, etc.) of environment 100 can perform one or more functions described as being performed by another set of systems or another set of devices of environment 100.

Figure 2:
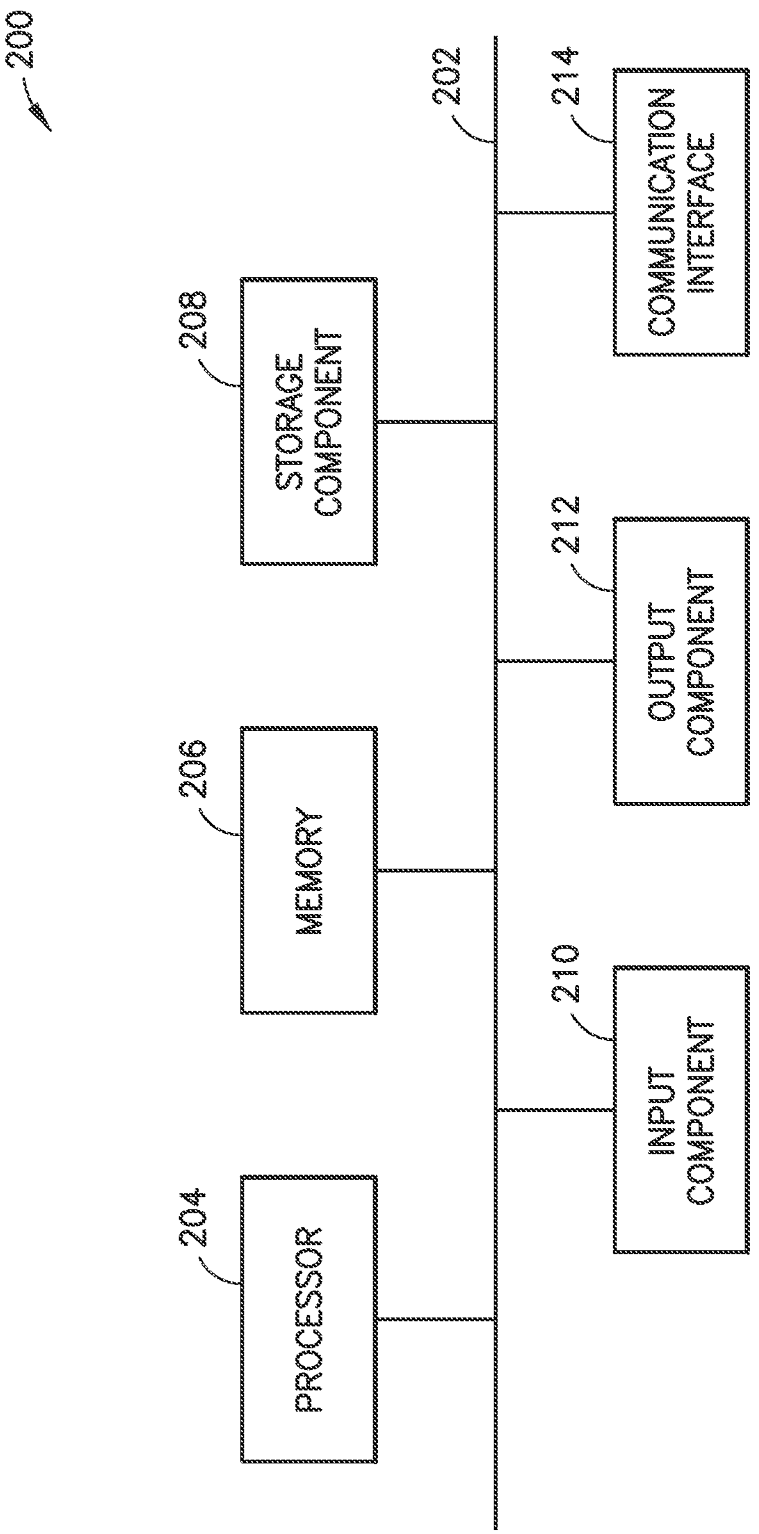
FIG. 2 is a diagram of non-limiting embodiments or aspects of components of one or more devices and/or one or more systems of FIGS. 1A and 1B.

Referring now to FIG. 2, FIG. 2 is a diagram of example components of a device 200. Device 200 may correspond to user device 102 (e.g., one or more devices of a system of user device 102, etc.) and/or one or more devices of management system 104. In some non-limiting embodiments or aspects, user device 102 (e.g., one or more devices of a system of user device 102, etc.) and/or one or more devices of management system 104 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, an image capture device, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3A:
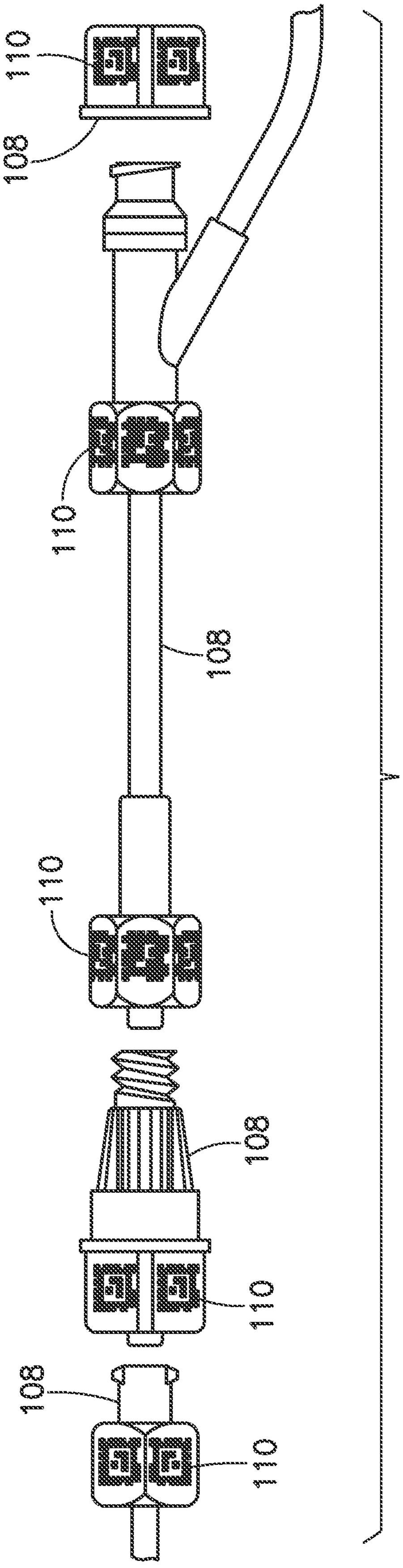
FIG. 3A is a perspective view of implementations of non-limiting embodiments or aspects of medical devices.
Figure 3B:
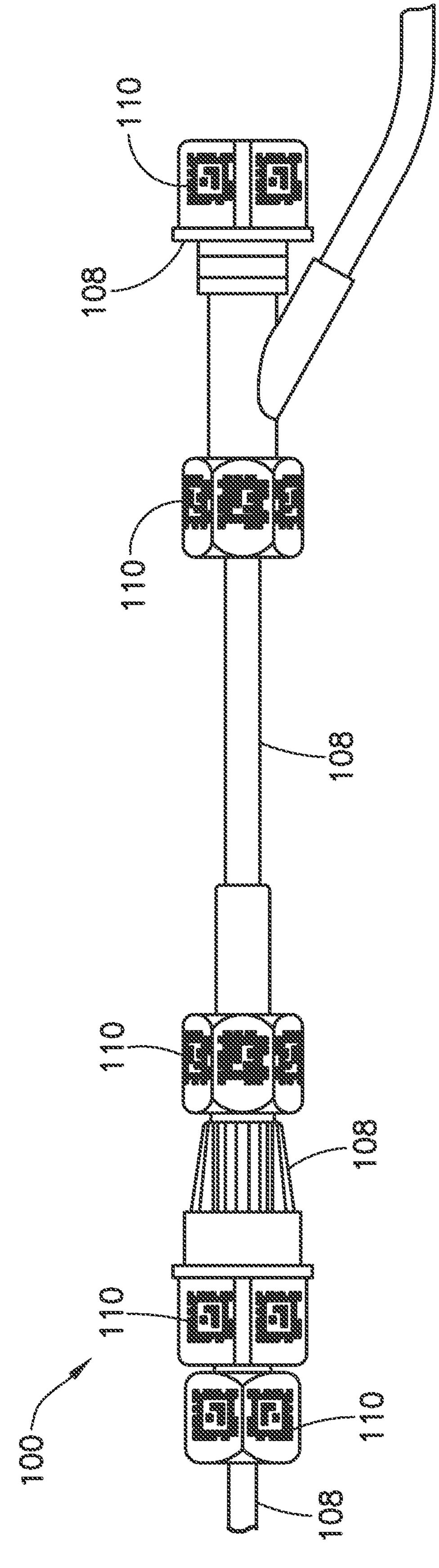
FIG. 3B is a perspective view of the implementations of non-limiting embodiments or aspects of medical devices in FIG. 3A connected together.

Referring now to FIGS. 3A and 3B, FIG. 3A is a perspective view of implementations of non-limiting embodiments or aspects of medical devices, and FIG. 3B is a perspective view of the implementations of non-limiting embodiments or aspects of medical devices in FIG. 3A connected together.

A medical device 108 may include at least one of the following types of medical devices: a peripheral IV catheter (PIVC), a peripherally inserted central catheter (PICC), a midline catheter, a central venous catheter (CVC), a needleless connector, a catheter dressing, a catheter stabilization device, a disinfectant cap, a disinfectant swab or wipe, an IV tubing set, an extension set, a Y connector, a stopcock, an infusion pump, a flush syringe, a medication delivery syringe, an IV fluid bag, a lumen adapter (e.g., a number of lumen adapters associated with a catheter may indicate a number of lumens included in the catheter, etc.), or any combination thereof.

A fiducial marker 110 (e.g., a tag, a label, a code, etc.) may be associated with (e.g., removably attached to, permanently attached to, integrated with, implemented on, etc.) a medical device 108. In some non-limiting embodiments or aspects, each medical device 108 in environment 100 may be associated with a fiducial marker 110. In some non-limiting embodiments or aspects, only a portion of the medical devices 108 in environment 100 may be associated with fiducial markers 110. In some non-limiting embodiments or aspects, none of the medical devices 108 in environment 100 may be associated with a fiducial marker 110.

A fiducial marker 110 may encapsulate an identifier associated with a type of a medical device 108 associated with the fiducial marker 110 and/or uniquely identify the medical device 108 associated with the fiducial marker 110 from other medical devices. For example, a fiducial marker 110 may encapsulate an identifier associated with at least one of the following types of medical devices: a peripheral IV catheter (PIVC), a peripherally inserted central catheter (PICC), a midline catheter, a central venous catheter (CVC), a needleless connector, a disinfectant cap, a disinfectant swab or wipe, an IV tubing set, an extension set, a Y connector, a stopcock, an infusion pump, a flush syringe, a medication delivery syringe, an IV fluid bag, or any combination thereof, and/or uniquely identify a medical device 108 (e.g., a first needleless connector, etc.) from other medical devices (e.g., a second needleless connector, etc.) including identifiers associated with a same type of medical device.

A fiducial marker 110 may encapsulate pose information associated with a 3D position of the fiducial marker 110. For example, fiducial marker 110 may include markings that, when captured in an image, enable computing a precise 3D position of the fiducial marker with respect to the image capture device that captured the image (e.g., an x, y, z coordinate position of the fiducial marker, etc.) and/or a precise 2D position of the fiducial marker in the image itself (e.g., an x, y coordinate positon of the fiducial marker in the image, etc.).

In some non-limiting embodiments or aspects, a fiducial marker 110 may include an AprilTag. For example, a fiducial marker 110 may include an AprilTag V3 of type custom Tag 48h12, which enables using AprilTag V3 detection to determine a unique ID, which may indicate a type of the medical device 108 associated with the fiducial marker (e.g., in leading digits, etc.) and/or a unique serial number for that specific medical device 108 (e.g., in the trailing digits, etc.), and/or a location (e.g., x, y, and z coordinates, directional vectors for Z, Y, and X axes, etc.) of the fiducial marker 110 in a field-of-view (FOV) of an image capture device. However, non-limiting embodiments or aspects are not limited thereto, and a fiducial marker 110 may include a QR code, a barcode (e.g., a 1D barcode, a 2D barcode, etc.), an Aztec code, a Data Matrix code, an ArUco marker, a colored pattern, a reflective pattern, a fluorescent pattern, a predetermined shape and/or color (e.g., a red pentagon, a blue hexagon, etc.), an LED pattern, a hologram, and/or the like that encapsulates an identifier associated with a type of a medical device 108 associated with the fiducial marker 110, uniquely identifies the medical device 108 associated with the fiducial marker 110 from other medical devices, and/or encapsulates pose information associated with a 3D position of the fiducial marker 110.

In some non-limiting embodiments or aspects, a fiducial marker 110 may include color calibration regions positioned adjacent to variable color regions to calibrate color in a wider range of lighting conditions. For example, for a 2×2 grid, a cell (1,1) in an upper-left corner of the gird may include a predetermined and/or standard calibration color region (e.g., neutral gray, etc.), and user device 102 and/or management system 104 may use the predetermined and/or standard calibration color region to calibrate colors in images used to detect or determine the fiducial marker 110 in those images and/or to detect or determine color changes in tissue of a patient (e.g., patient tissue adjacent an insertion site, etc.) in those images. In such an example, user device 102 and/or management system 104 may use the predetermined and/or standard calibration color region to orient the fiducial marker 110 to determine how to properly rotate and decode the colors in the fiducial marker 110 to decode the identifier encapsulated by the fiducial marker 110 and/or track the fiducial marker 110 within environment 100.

As shown in FIGS. 3A and 3B, fiducial markers 110 may be arranged symmetrically in rings about an axis of a medical device 108 associated with those fiducial markers, which may enable at least one fiducial marker 110 being presented to the FOV of an image capture device regardless of an orientation of the medical device 108. A fiducial marker 110 may be clocked such that a direction of the marker (e.g., as indicated by the pose information thereof, etc.) aligns with the proximal or distal direction of fluid flow through a medical device 108 associated with that fiducial marker. A fiducial marker 110 may be rigidly affixed to a medical device 108 such that the fiducial marker 110 cannot translate along and/or rotate around the medical device 108 (e.g., rigidly affixed to a rigid portion of a medical device 108 and/or a catheter tree including the medical device 108, etc.), which may reduce movement and/or changes in distance of the fiducial marker relative to other fiducial markers and/or medical devices.

Fiducial markers 110 may be located at or directly adjacent to connection points or ports of each medical device 108, such that the fiducial markers 110 on connected medical devices 108 are collinear (e.g., parallel, etc.). For example, fiducial markers 110 on connected medical devices 108 that are collinear (e.g., parallel, etc.) in this way may also be contiguous, or at a known distance apart.

A single medical device 108 may include one or more sets of fiducial markers 110. For example, as shown in FIGS. 3A and 3B, the cap at the far right of each of these figures includes a single set of fiducial markers 110 (e.g., with each fiducial marker 110 in the set being identical and/or encapsulating the same information, etc.), and the tubing directly to the left of the cap includes two sets of fiducial markers 110 at respective connection points of the tubing and separated by the tubing. In such an example, collinearity between the fiducial markers 110 at each end of the tubing may not be guaranteed, and connection between the fiducial markers 110 at each end of the tubing may be established via a pre-defined scheme (e.g., with each fiducial marker 110 in each set of fiducial markers 110 on the same medical device 108 having a same value or different but contiguous values, etc.). It is noted that spacing between connected medical devices 108 may vary (e.g., as shown on the left in FIG. 3B, etc.); however, this spacing may be deterministic and known by user device 102 and/or management system 104 for each possible connection between medical devices.

Figure 4:
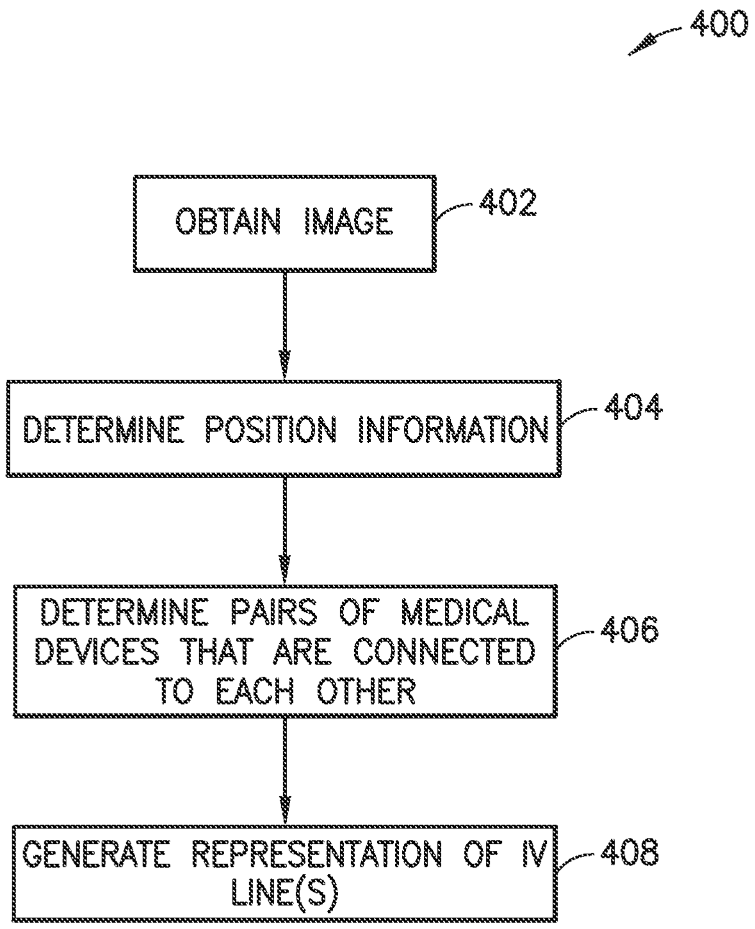
FIG. 4 is a flow chart of non-limiting embodiments or aspects of a process for vascular access management.

Referring now to FIG. 4, FIG. 4 is a flowchart of non-limiting embodiments or aspects of a process 400 for vascular access management. In some non-limiting embodiments or aspects, one or more of the steps of process 400 may be performed (e.g., completely, partially, etc.) by user device 102 (e.g., one or more devices of a system of user device 102, etc.). In some non-limiting embodiments or aspects, one or more of the steps of process 400 may be performed (e.g., completely, partially, etc.) by another device or a group of devices separate from or including user device 102, such as management system 104 (e.g., one or more devices of management system 104, etc.).

Figure 5:
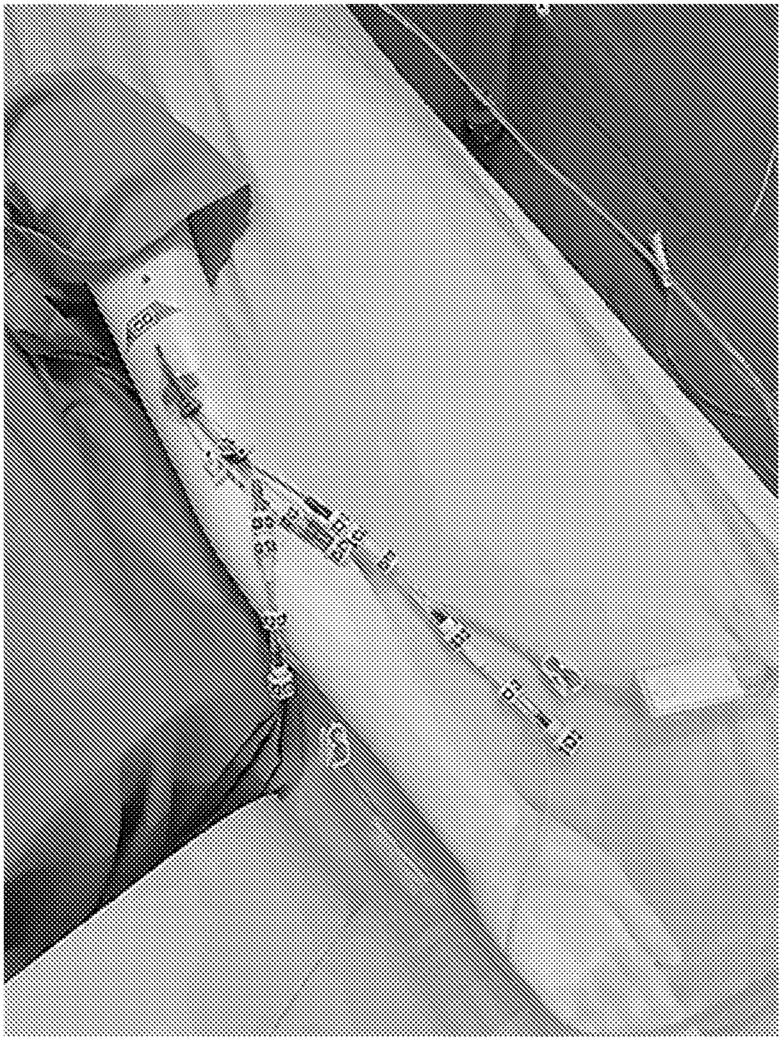
FIG. 5 shows an example image of a catheter insertion site including a plurality of medical devices.

As shown in FIG. 4, at step 402, process 400 includes obtaining an image. For example, user device 102 may obtain an image (e.g., a single image, a plurality of images, a series of images, etc.) of a plurality of medical devices 108, captured by an image capture device. As an example, an image capture device of user device 102 may capture the image of the plurality of medical devices 108. In such an example, a nurse may use user device 102 to take one or more images of a catheter site of a patient and/or an infusion pump connected to the catheter site. For example, FIG. 5 shows an example image of a catheter insertion site including a plurality of medical devices.

In some non-limiting embodiments or aspects, an image may include a series of images. For example, an image capture device of user device 102 may capture the series of images using a burst capture technique (e.g., a "burst mode", a continuous shooting mode, etc.), which may enable user device 102 to create a second likelihood layer for determining probabilities that pairs of medical devices 108 are connected as described herein below in more detail, thereby refining motion artifacts, angles, distances, and/or missed fiducial marker detection. As an example, an image capture device of user device 102 may capture the series of images as a live video feed to identify pairs of medical devices 108 that are connected to each other (e.g., to identify catheter tree components and generate a catheter tree, etc.) as the live video feed is captured.

As shown in FIG. 4, at step 404, process 400 includes determining position information. For example, user device 102 may determine, based on the image, position information associated with a 3D position of the plurality of medical devices 108 relative to the image capture device and/or a 2D position of the medial device 108 in the image itself. In such an example, determining the position information associated with the 3D position of the plurality of medical devices 108 relative to the image capture device and/or the 2D position of the plurality of medical devices 108 in the image itself may further include determining, based on the image, a type of each medical device of the plurality of medical devices 108.

Figure 6:
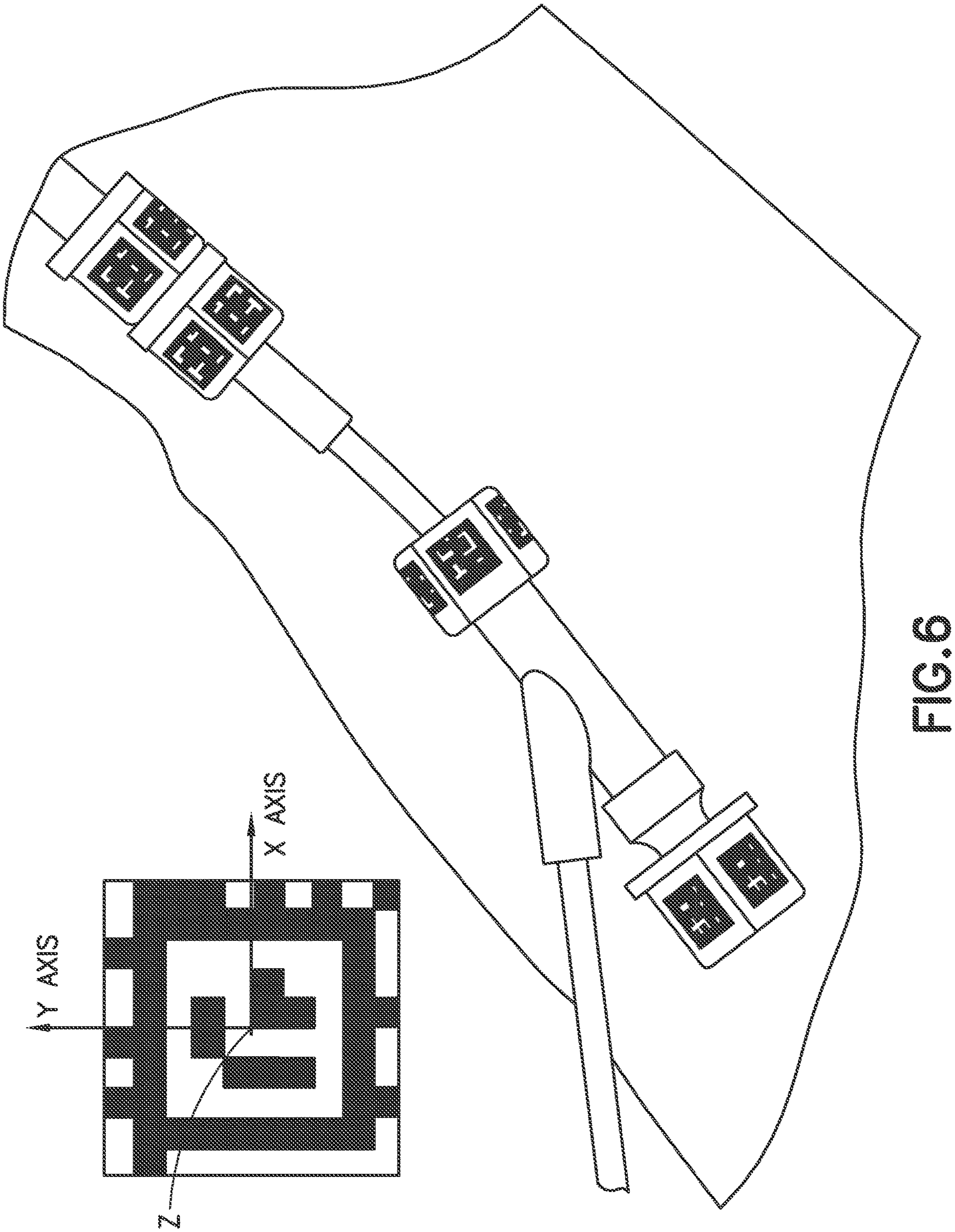
FIG. 6 illustrates an implementation of non-limiting embodiments or aspects of a fiducial marker.

In some non-limiting embodiments or aspects, a first group of medical devices of the plurality of medical devices 108 is associated with a plurality of fiducial markers 110. The plurality of fiducial markers 110 may encapsulate a plurality of identifiers associated with the first group of medical devices and pose information associated with the 3D position and/or 2D position of the plurality of fiducial markers 110. In such an example, user device 102 may determine the position information associated with the 3D position of the first group of medical devices relative to the image capture device and/or the 2D position of the plurality of medical devices 108 in the image itself by determining or identifying, based on the image, the plurality of fiducial markers 110 associated with the first group of medical devices and the pose information associated with the 3D positions and/or 2D positions of the plurality of fiducial markers 110. For example, and referring also to FIG. 6, the plurality of fiducial markers 110 may include a plurality of AprilTags, and user device 102 may process the image using AprilTag detection software to determine types of the medical devices 108 associated with the fiducial markers 110 and/or a unique serial number for the specific medical devices 108 and to compute a precise 3D position, orientation, and/or identity of the plurality of fiducial markers 110 relative to the image capture device that captured the image and/or a precise 2D position of the plurality of fiducial markers 110 in the image itself. As an example, for each medical device 108 of the first group of medical devices, the position information associated with the 3D position of that medical device 108 relative to the image capture device may be determined as the 3D position of a fiducial marker 110 associated with that medical device 108 relative to the image capture device and/or the position information associated with the 2D positon of that medical device 108 in the image itself may be determined as the 2D position of the fiducial marker 110 associated with that medical device 108. In such an example, for each medical device 108 of the first group of medical devices, the 3D position of the fiducial marker 110 associated with that medical device relative to the image capture device may include x, y, and z coordinates of the fiducial marker 110 and/or directional vectors for Z, Y, and X axes of the fiducial marker 110. In such an example, for each medical device 108 of the first group of medical devices, the 2D position of the fiducial marker 110 in the image itself may include x, y coordinates of the fiducial marker 110 in the image and/or direction vectors for Y and X axes of the fiducial marker.

In some non-limiting embodiments or aspects, a second group of medical devices of the plurality of medical devices is not associated with a fiducial marker. In such an example, user device 102 may determine the position information associated with the 3D position of the second group of medical devices relative to the image capture device and/or the 2D position of the second group of medical devices in the image itself by determining or identifying, for each medical device of the second group of medical devices, based on the image, using one or more existing object detection techniques, a type of that medical device, the 3D position of that medical device relative to the image capture device, and/or the 2D position of that medical device in the image itself. For example, medical devices 108 without fiducial markers or identifier tags can be identified by user device 102 processing the image using one or more object detection techniques (e.g., a deep learning technique, an image processing technique, an image segmentation technique, etc.) to identify or determine medical devices 108 in the image and the position information associated with the 3D position of the identified medical devices 108 relative to the image capture device (e.g., include x, y, and z coordinates of the medical devices and directional vectors for Z, Y, and X axes of the medical devices 108, etc.) and/or the 2D positions of the identified medical devices in the image itself. For example, a deep learning technique may include a bounding box technique that generates a box label for objects (e.g., medical devices 108, etc.) of interest in images, an image masking technique (e.g., masked FRCNN (RCNN or CNN)) that captures specific shapes of objects (e.g., medical devices 108, etc.) in images, a trained neural network that identifies objects (e.g., medical devices 108, etc.) in images, a classifier that classifies identified objects into classes or type of the objects, and/or the like. As an example, an image processing technique may include a cross correlation image processing technique, an image contrasting technique, a binary or colored filtering technique, and/or the like. As an example, different catheter lumens may include unique colors that can be used by the image processing to identify a type of the catheter.

In some non-limiting embodiments or aspects, user device 102 may process the image data using a stereoscopic imaging technique and/or a shadow distance technique to determine object data including a distance from the image capture device to detected objects and/or distances between detected objects, and/or user device 102 may obtain the image data using multiple cameras, a laser focus technology, LIDAR sensors, and/or a camera physical zoom-in function to determine object data including a distance from the image capture device to detected objects and/or distances between detected objects. In some non-limiting embodiments or aspects, user device 102 may obtain image data and/or object data including a 3D profile of an object using a 3D optical profiler.

For example, an image capture device may include a stereo camera, and/or the position information associated with the 3D position of the plurality of medical devices relative to the image capture device may be determined using a Structure from Motion (SfM) algorithm. As an example, user device 102 may include a stereo camera setup, which is available in many mobile devices, such as Apple® iPads, Apple® iPhones, Android® tablets, Android® phones, and/or the like. User device 102 may process images from the stereo camera using SfM algorithms to extract 3D information which may enhance the object feature recognition of the fiducial markers 110 of the first group of medical devices and/or of the medical devices in the second group of medical devices without fiducial markers. As an example, the SfM processing may improve extraction of the 3D features from the medical devices in the second group of medical devices without fiducial markers, which may improve chances of image feature accumulation, e.g., by using a burst image capture/video mode which captures images in a proper direction/registration (e.g., pan/tilt, etc.) based on the setup or locations of the medical devices 108 and/or an anatomical position thereof on the body of the patient, with a catheter tree being built by starting from a dressing tag and connecting center-points or centroids of medical devices 108 detected using object recognition techniques to other medical devices 108 with or without fiducial markers 110. As another example, these 3D features extracted using the SfM processing may be utilized for a calculation of a co-planarity of medical devices 108 (e.g., for generating a catheter tree, etc.), which may provide an added advantage on a multi-lumen & multi-tubing catheter setup by reducing missed connections that may occur in a 2D single plane space due to false co-linearity.

For example, an image capture device may include a LIDAR system, and the image may include a LiDAR point cloud. As an example, user device 102 may include a mini-LiDAR system, which is available in many mobiles devices, such as Apple® iPads, Apple® iPhones, Android® tablets, Android® phones, and/or the like. In such an example, use of LiDAR images may improve accuracy for 3D feature detection because LiDAR images directly provide 3D world information as point clouds which may accelerate the 3D data collection with reduced or minimum protocols when compared to stereo setup. For example, user device 102 may use existing image registration and/or transformation techniques to overlap 2D object information from camera images, such as color, texture and/or the like, with the 3D LiDAR point cloud to detect 3D features for enhancing catheter tree generation and connection accuracy, which may also improve augmented reality generation and environment restructuring, as well as guide the catheter tree-generation and connectivity determination.

Figure 7:
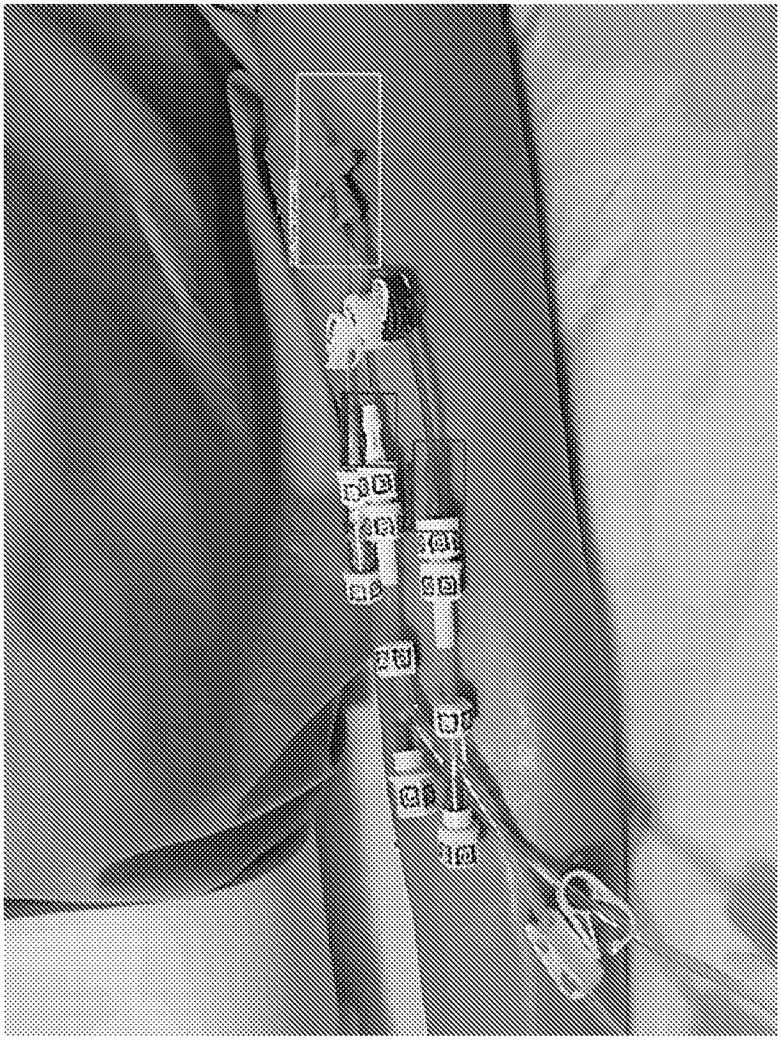
FIG. 7 is a perspective view of an example image of a catheter insertion site on a patient.

For example, and referring also to FIG. 7, which is a perspective view of an example catheter insertion site on a patient, due to a positioning of the AprilTags and the different tubing, there may be a high chance for tree generation mismatch (e.g., incorrect determination of connections between medical devices, etc.) as the fiducial markers 110 and/or the medical devices 108 appear to be co-linear in 2D due to their proximity. User device 102 may use the above-described stereo image/SfM and/or LIDAR image based approaches for determining 3D features of the fiducial markers 110 and/or the medical devices 108 to improve the co-planar information and/or provide more accurate catheter tree generation (e.g., more accurate determination of connections between devices, etc.).

Further details regarding non-limiting embodiments or aspects of step 404 of process 400 are provided below with regard to FIGS. 12A and 12B, 15, 17, and 18.

As shown in FIG. 4, at step 406, process 400 includes determining pairs of medical devices that are connected to each other. For example, user device 102 may determine, based on the position information and/or the types of the plurality of medical devices 108, pairs of medical devices of the plurality of medical devices 108 that are connected to each other. As an example, for each pair of medical devices of the plurality of medical devices 108, user device 102 may determine, based on the 3D position information associated with that pair of medical devices, the 2D position information associated with that pair of medical devices, and/or the types of that pair of medical devices, a probability that that pair of medical devices are connected to each other. In such an example, for each medical device of the plurality of medical devices 108, that medical device may be determined to be connected to another medical device in a pair of medical devices including that medical device that is associated with a highest probability of the pairs of medical devices including that medical device.

Figure 8:
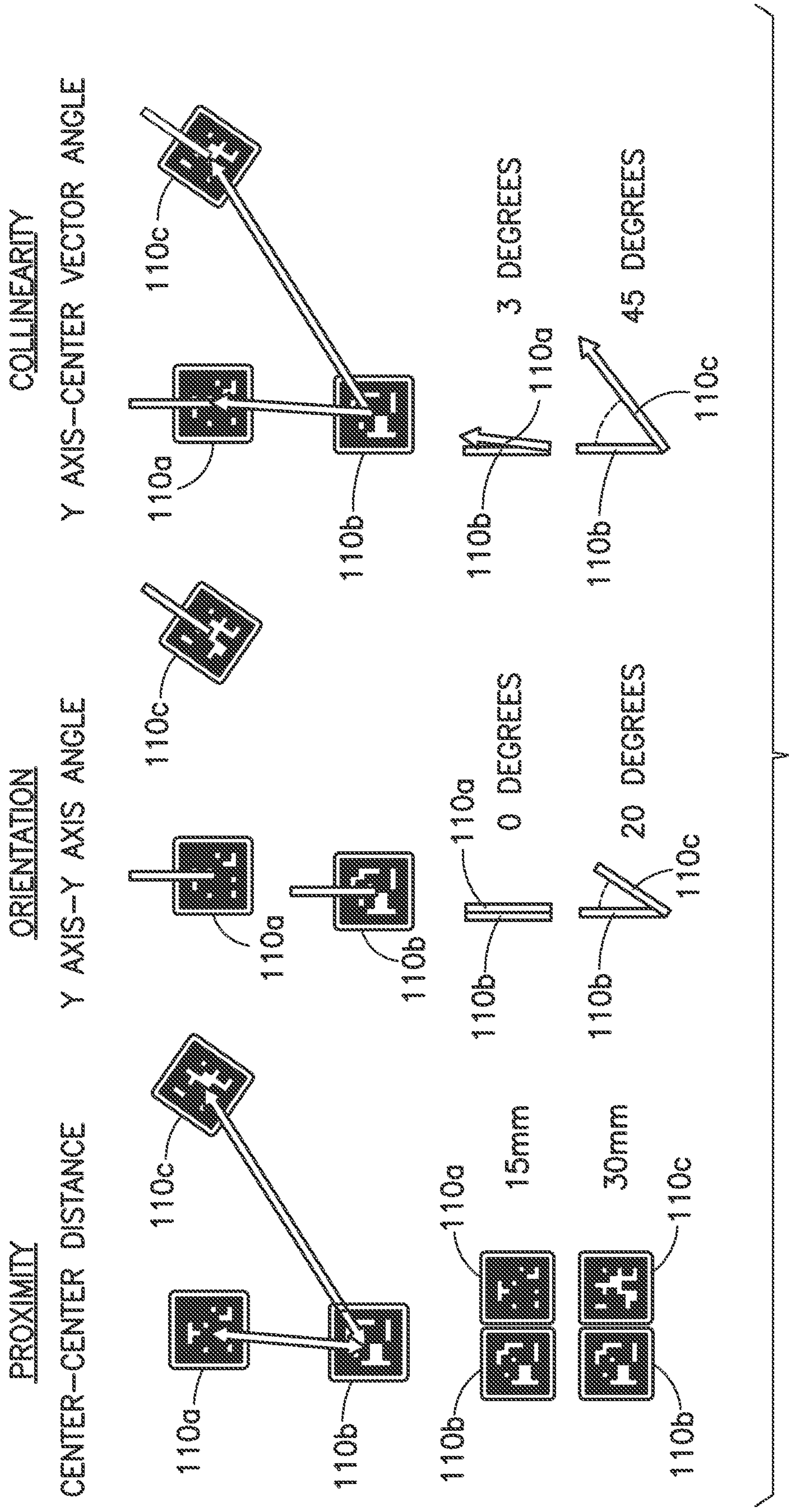
FIG. 8 illustrates example parameters used in an implementation of non-limiting embodiments or aspects of a process for vascular access management.

For example, for each pair of medical devices of the plurality of medical devices, user device 102 may determine, based on the position information associated with that pair of medical devices, the following parameters: a distance between center points associated with that pair of medical devices, an angular difference between orientations of that pair medical devices, and/or an angle from collinearity of that pair of medical devices, and the probability that that pair of medical devices is connected may be determined based on the distance between the center points of that pair of medical devices, the angular difference between the orientations of that pair of medical devices, and/or the angle from collinearity of that pair of medical devices. As an example, and referring also to FIG. 8, for each pair of fiducial markers of the plurality of fiducial markers 110*a*, 110*b*, and 110*c*, user device 102 may determine, based on the 3D position information associated with that pair of fiducial markers and/or the 2D position information, the following parameters: a distance between center points of that pair of fiducial markers (e.g., a proximity, etc.), an angular difference between orientations of that pair of fiducial markers (e.g., an orientation, etc.), and/or an angle from collinearity of that pair of fiducial markers (e.g., a collinearity, etc.), and the probability that the pair of medical devices associated with that pair of fiducial markers is connected may be determined based on the determined proximity, orientation, and/or collinearity (e.g., an angular difference in orientation and angle created by tag orientation and the connection vector, etc.). Although shown in FIG. 8 as determined between pairs of fiducial markers 110, non-limiting embodiments or aspects are not limited thereto and the proximity, orientation, and/or collinearity between medical devices may be determined as between pairs of medical devices without fiducial markers and/or between pairs of medical devices including a single medical device associated with a fiducial marker and a single medical device without a fiducial marker.

In some non-limiting embodiments or aspects, user device 102 may use a probability-based tree building logic or a ruleset (e.g., a predetermined ruleset, etc.) to determine the pair of medical devices 108 that are connected to each other. As an example, user device 102 may determine the probabilities for each medical device 108 toward each of the other medical devices using the above-described parameters of proximity, orientation, and/or collinearity (and/or one or more additional parameters, such as X and Y axes distances between the pair of medical devices, a difference in depth from the image capture device between the pair of medical devices, and/or the like), and user device 102 may give each parameter a predefined weight toward a total probability that the pair of medical devices are connected to each other (e.g., a sum of each parameter weight may be 1, etc.) when applying the probability-based tree building logic or ruleset to determine the pairs of medical devices 108 that are connected to each other. In such an example, user device 102 may process the pairs of medical devices 108 by using a dressing tag and/or a lumen adapter as a starting point or anchor for generation of a catheter tree or representation of the IV line(s), and, for each medical device, that medical device may be determined to be connected to the other medical device in the pair of medical devices for which that medical device has a highest connection probability.

In such an example, user device 102 may identify, based on the type of each medical device of the plurality of medical devices, a set of medical devices of the plurality of medical devices 108 that are associated with a preferred IV line architecture. For a pair of medical devices included in the set of medical devices associated with the preferred IV line architecture, user device 102 may adjust a weight used to determine whether the pair of medical devices are connected to each other (e.g., a known preferred architecture may receive a higher weight in the connection determination logic, etc.). As an example, if user device 102 identifies each of the medical devices or disposables needed to generate a preferred architecture connection for each IV line in the image, user device 102 may determine the connections between the pair of medical devices by giving more probability for preferred connections including pairs of medical devices that are connected in the preferred architecture (e.g., a lumen adaptor connected to IV tubing, etc.). For example, a proximity or distance parameter of a pair of preferred architecture pieces may be weighted more strongly compared to other parameters (e.g., orientation, collinearity, etc.) when the medical devices are determined to be within a threshold proximity or distance of each other. In some non-limiting embodiments or aspects, in response to determining an unlikely parameter associated with a pair of medical devices (e.g., a dressing being a threshold distance, such as 30 cm, away from a lumen adapter, etc.) user device 102 may prompt a user to retake the image and/or provide a notification to the user of the unlikely parameters (e.g., asking if there are multiple catheter components in a single image, etc.).

In some non-limiting embodiments or aspects, user device 102 may adjust a weight used to determine whether the pair of medical devices are connected to each other based on a determination that a medical device of the pair of medical devices is connected to another medical device (e.g., another medical device in a preferred IV line architecture including the pair of medical devices). For example, for a pair of medical devices including a first medical device and a second medical device, if user device 102 determines that the first medical device is already connected to a third medical device of a preferred IV line structure including the first medical device, the second medical device, and the third medical device, user device 102 may give a higher probability of the first medical device and the second medical device being connected because such a connection complete the preferred IV line architecture.

In such an example, if user device 102 identifies only a portion of the medical devices or disposables needed to generate a preferred architecture connection for each IV line in the image, user device 102 may determine the connections between the pair of medical devices by giving more probability for preferred connections including pairs of medical devices that are connected in the preferred architecture and are of a predetermined type of medical device (e.g., devices that are not caps, etc.). For example, if a triple lumen catheter is expected for a preferred architecture and only a single IV tubing is identified in the image, user device 102 may automatically expect caps on the other lumens or lumen adapters, and if user device 102 does not identify the caps in the image, user device 102 may prompt the user to retake the image and/or provide a notification to the user that requests clarification.

In such an example, user device 102 may determine, based on the type of each medical device of the plurality of medical devices, that no medical devices of the plurality of medical devices 108 are associated with a preferred IV line architecture. For example, in response to determining that no medical devices of the plurality of medical devices 108 are associated with the preferred IV line architecture, user device 102 may prompt a user to obtain another image.

In such an example, user device 102 may determine, based on the type of each medical device of the plurality of medical devices, that a number of medical devices of the plurality of medical devices 108 is greater than a number of medical devices associated with a preferred IV line architecture. For example, if a number of medical devices identified is greater than a number needed to generate preferred architecture connections for each lumen or IV line, it implies that there may be daisy-chaining or multiple tagged components inside the image. As an example, if user device 102 identifies more IV tubing sets than catheter lumens, user device 102 may give more weight to multiple tubing to IV tubing Y-port connections in the probability-based tree building logic. As another example, if user device 102 identifies a threshold number of caps, user device 102 may give more weight to the proximity parameter for detecting a distance of medical devices from open ports.

Referring now to FIG. 9, FIG. 9 is a chart of example unlikely but possible connections between medical devices. For example, a probability of connection for medical devices of a same class or type may be zero (a tube may be an exception-however a tube may have a secondary tube Y-port tag). For example, unlikely connections between medical devices 108 may be connections between medical devices that are unexpected and/or serve no purpose; however, such connections may not be incorrect and/or may potentially be initiated by some users. Loose dressings and/or fiducial markers 110 for dressings may be left around a catheter insertion site and appear close to a tubing set or other identified medical devices, and user device 102 may adjust a weight or give priority to dressing tag proximity or distance from catheter lumen adapters and the tag vectors angle from each other in the probability-based tree building logic to determine that these loose fiducial markers or tags are not attached to any of the medical devices. Loose caps may float around on a bed or a patient close to other tagged objects, and user device 102 may automatically determine that a cap is not connected to another medical device if a distance between the cap and the other medical device satisfies a predetermined threshold distance. Loose tubing sets on the bed or patient may be processed in a same or similar manner as loose caps. It is unlikely but possible that lumen adapters may be connected to each other, and user device 102 may determine whether lumen adapters are connected to each other based on a distance and/or a collinearity of the two adapters.

In some non-limiting embodiments or aspects, user device 102 may process the position information and/or the types of the plurality of medical devices 108 with a machine learning model to determine probabilities that pairs of medical devices are connected. For example, user device 102 may generate a prediction model (e.g., an estimator, a classifier, a prediction model, a detector model, etc.) using machine learning techniques including, for example, supervised and/or unsupervised techniques, such as decision trees (e.g., gradient boosted decision trees, random forests, etc.), logistic regressions, artificial neural networks (e.g., convolutional neural networks, etc.), Bayesian statistics, learning automata, Hidden Markov Modeling, linear classifiers, quadratic classifiers, association rule learning, and/or the like. The prediction machine learning model may be trained to provide an output including a prediction of whether a pair of medical devices are connected to each other. In such an example, the prediction may include a probability (e.g., a likelihood, etc.) that the pair of medical devices are connected to each other.

User device 102 may generate the prediction model based on position information associated with each medical device and/or types of each medical device (e.g., training data, etc.). In some implementations, the prediction model is designed to receive, as an input, the position information associated with each medical device in a pair of medical devices (e.g., a proximity between the devices, an orientation between the devices, a collinearity between the devices, etc.) and provide, as an output, a prediction (e.g., a probability, a likelihood, a binary output, a yes-no output, a score, a prediction score, a classification, etc.) as to whether the pair of medical devices are connected to each other. In some non-limiting embodiments or aspects, user device 102 stores the prediction model (e.g., stores the model for later use). In some non-limiting embodiments or aspects, user device 102 stores the initial prediction model in a data structure (e.g., a database, a linked list, a tree, etc.). In some non-limiting embodiments, the data structure is located within user device 102 or external (e.g., remote from) user device 102 (e.g., within management system 104, etc.).

Figure 10:
FIG. 10 illustrates an implementation of non-limiting embodiments or aspects of a representation of IV lines.

As shown in FIG. 4, at step 408, process 400 includes generating a representation of at least one IV line. For example, user device 102 may generate, based on the pairs of medical devices that are determined to be connected to each other, a representation of at least one IV line including the pairs of medical devices that are determined to be connected to each other. As an example, and referring also to FIG. 10, which illustrates an implementation of non-limiting embodiments or aspects of a representation of IV lines (e.g., a catheter tree, etc.), user device 102 may automatically draw lines connecting medical devices (e.g., catheter tree components, etc.) individually for each IV line and/or display identifying information associated with each IV line and/or individual medical devices 108 in each IV line. In such an example, user device 102 may automatically draw and display the lines on an image and/or within a series of images, such as a live video feed, and/or the like of the medical devices/catheter insertion site. For example, user device 102 may generate a digital representation of each IV line including each pair of medical devices in each IV line according to the pairs of medical devices that are determined to be connected to each other. In such an example, user device 102 may associate each IV line with a fluid source or pump of an infusion pump and monitor a flow of a fluid in the IV line(s) based at least partially on the representation of the fluid flow path. As an example, user device 102 may control an audio and/or visual output device to output an audible and/or visible indication, wherein the audible and/or visible indication indicates a status of the IV line and/or the fluid flowing therethrough. For example, user device 102 may generate a catheter tree or a logical IV branch structure that maps over the physical IV branch structure and includes a unique node identifier for each medical device of the physical IV branch structure, each connector or entry/exit point to a fluid flow path formed by the medical devices, and/or each element of a medical device associated with an action that can affect the fluid flow path, (e.g., a valve in a medical device).

Figure 11A:
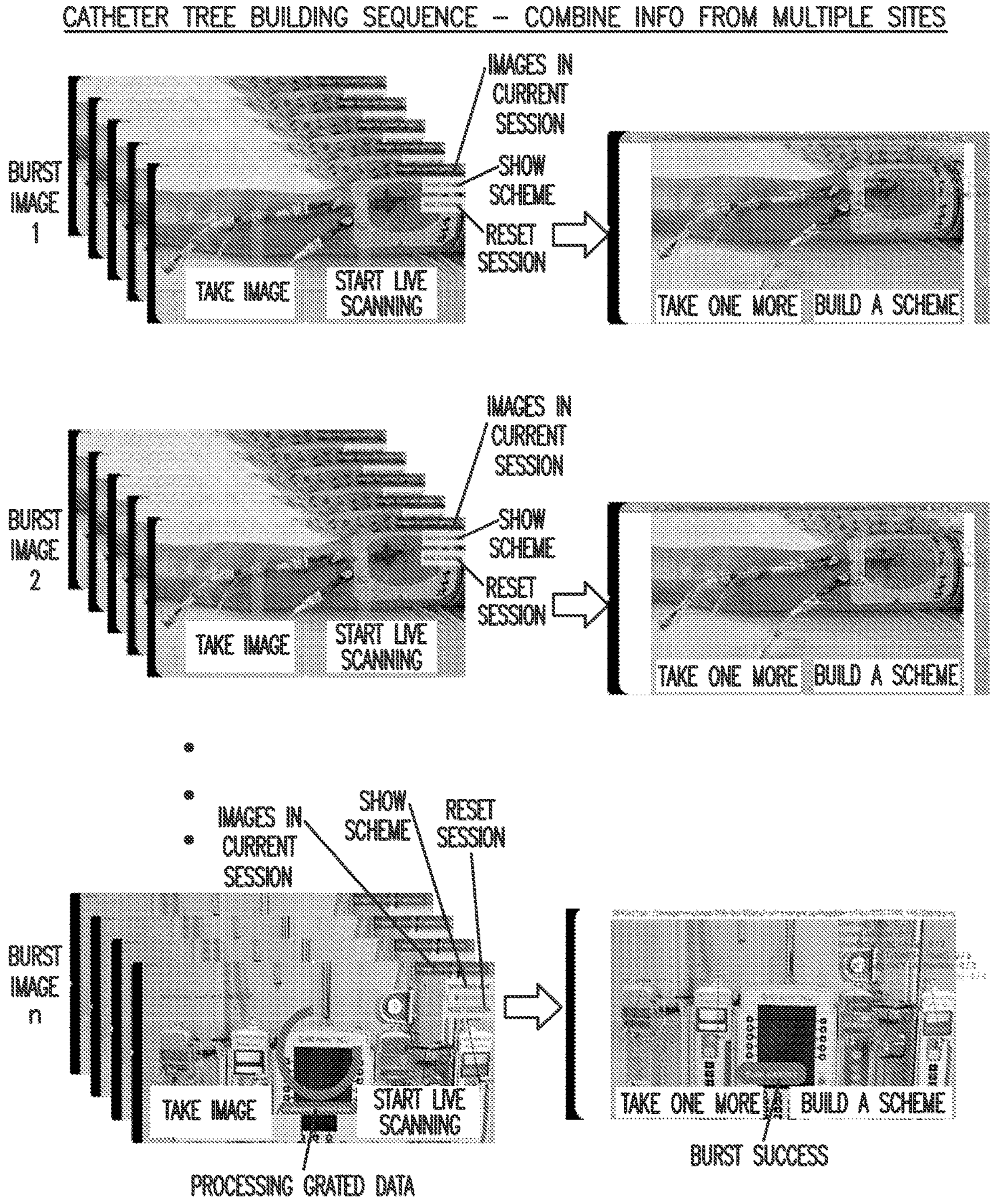
FIG. 11A illustrates an example catheter tree building sequence of a process for vascular access management according to non-limiting embodiments or aspects.
Figure 11B:
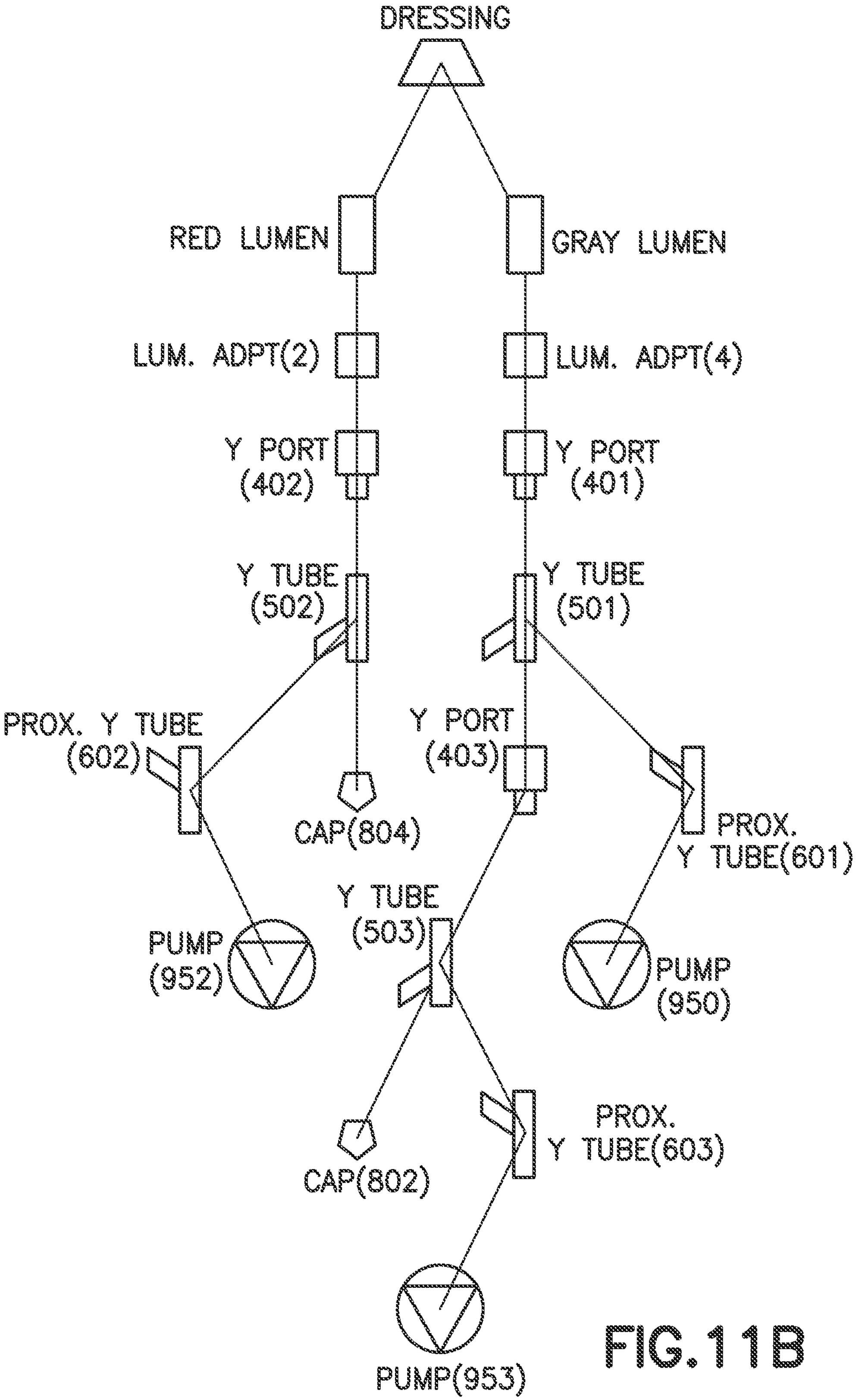
FIG. 11B illustrates an example catheter tree.

In some non-limiting embodiments or aspects, an image capture device of user device 102 may capture a plurality of images from a plurality of different fields of view or locations. For example, and referring also to FIG. 11A, which illustrates an example catheter tree building sequence, an image capture device of user device 102 may capture, using a burst capture technique, a series of images from a plurality of different field of views or locations (e.g., a first field of view or location including an insertion site on a patient, a second field of view or location including an infusion pump, etc.). A series of images may include tagged and/or untagged medical devices 108. User device 102 may continuously integrate and/or combine position information associated with medical devices 108 determined from each image in a series of images and from each series of images captured from each of the field of view or location and use the integrated position information to determine pairs of the medical devices 108 that are connected to each other and to build and display a catheter tree including IV lines formed by the pairs of medical devices that are determined to be connected to each other (e.g., a catheter tree including medical devices from an insertion site and/or dressing tag to an infusion pump or module, etc.). For example, FIG. 11B illustrates an example catheter tree that may be generated according to the catheter tree building sequence illustrated in FIG. 11A.

In some non-limiting embodiments or aspects, user device 102 may compare medication, medication dosage, medication delivery route or IV line, and/or medication delivery time associated with an IV line to an approved patient, approved medication, approved medication dosage, approved medication delivery route or IV line, and/or approved medication delivery time associated with the patient identifier and/or a medication identifier to reduce medication administration errors. User device 102 may issue an alert and/or the infusion pump to stop fluid flow and/or adjust fluid flow based on a current representation of the at least one IV line (e.g., based on a current state of the catheter tree, etc.). For example, if a medication scheduled for or loaded into the infusion pump at a point of entry in the fluid flow path is determined to be an improper medication for the patient, an improper dosage for the patient and/or medication, an improper medication delivery route for the patient and/or medication (e.g., improper point of entry to the fluid flow path), and/or an improper medication delivery time for the patient and/or medication, user device 102 may issue an alert and/or control the infusion pump to stop or prevent the fluid flow.

In some non-limiting embodiments or aspects, user device 102 may determine a dwell time of medical devices 108 (e.g., in environment 100, etc.) and/or connections thereof (e.g., an amount or duration of time a medical device is connected to another medical device and/or the patient, etc.). For example, user device 102 may determine, based on the probabilities that pairs of medical devices are connected, a time at which a medical device 108 enters the environment 100 and/or is connected to another medical device and/or the patient. As an example, user device 102 may automatically determine and/or record, based on the pairs of medical devices that are determined to be connected to each other (e.g., over a period of time, over a series of images, over a live video feed, etc.), a time at which a medical device 108 is connected to another medical device and/or the patient, a duration of time from the connection time to a current time that the medical device 108 has been connected thereto, and/or a time at which the medical device is disconnected from another medical device and/or the patient.

In some non-limiting embodiments or aspects, user device 102 may automatically determine and/or record, based on the pairs of medical devices that are determined to be connected to each other (e.g., over a period of time, over a series of images, over a live video feed, etc.), a frequency at which a medical device 108 is connected to another medical device or a particular type of medical device. For example, user device 102 may determine a frequency at which one or more disinfecting caps are connected to an IV access port, a luer tip, and/or the like and/or a duration that each cap is connected thereto.

In some non-limiting embodiments or aspects, user device 102 may compare a dwell time and/or a connection frequency associated with a medical device to a dwell time threshold and/or a frequency threshold associated with the medical device and/or a connection including the medical devices, and, if the dwell time and/or the connection frequency satisfies the dwell time threshold and/or the frequency threshold, provide an alert (e.g., via user device 102, etc.) associated therewith. For example, user device 102 may provide an alert indicating that it is time to replace a medical device in the catheter tree with a new medical device and/or that a medical device should be disinfected and/or flushed.

Figure 12A:
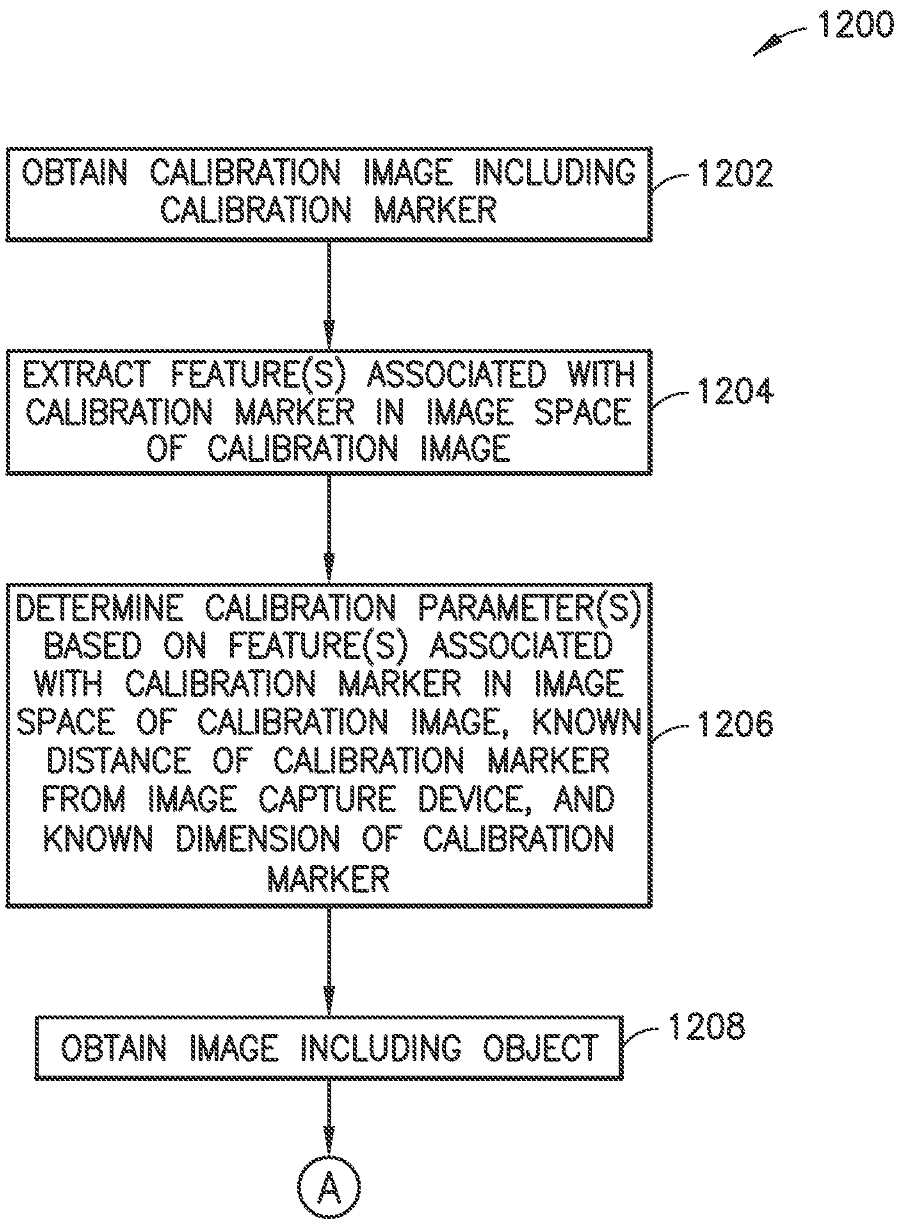
FIGS. 12A and 12B are flowcharts of non-limiting embodiments or aspects of a process for estimating object distance from an image capture device.
Figure 12B:
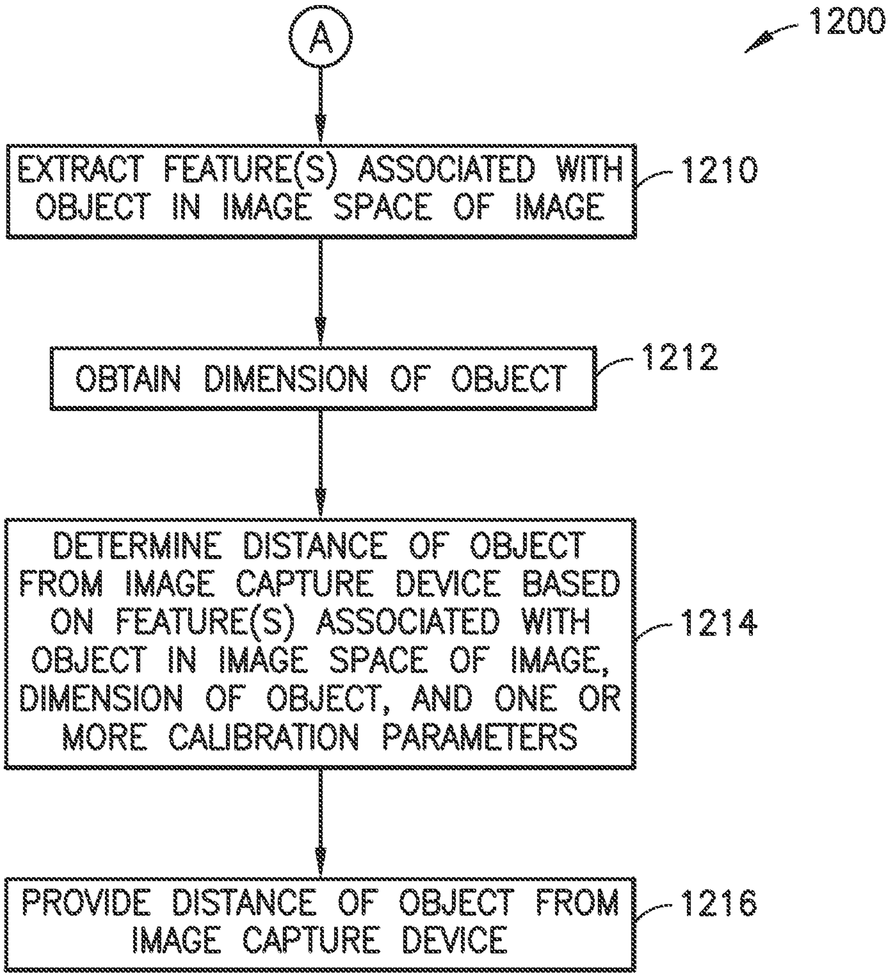

Referring now to FIGS. 12A and 12B, FIGS. 12A and 12B are a flowchart of non-limiting embodiments or aspects of a process 1200 for estimating object distance from an image capture device. In some non-limiting embodiments or aspects, one or more of the steps of process 1200 may be performed (e.g., completely, partially, etc.) by user device 102 (e.g., one or more devices of a system of user device 102, etc.). In some non-limiting embodiments or aspects, one or more of the steps of process 1200 may be performed (e.g., completely, partially, etc.) by another device or a group of devices separate from or including user device 102, such as management system 104 (e.g., one or more devices of management system 104, etc.).

As shown in FIG. 12A, at step 1202, process 1200 includes obtaining a calibration image including a calibration marker. For example, user device 102 may obtain, from an image capture device (e.g., an image capture device of user device 102, a monocular digital camera of user device 102, etc.), a calibration image including a calibration marker, the calibration marker having a known dimension and being located at a known distance from the image capture device. For example, user device 102 (e.g., the image capture device of user device 102, the monocular digital camera of user device 102, etc.) may capture, with a calibration marker having a known dimension located at a known distance from the image capture device of user device 102 (e.g., a known distance from a center of the calibration marker to a center of the image capture device, etc.), a calibration image including the calibration marker. As an example, the known dimension of the calibration marker may include a width of the calibration marker, a height of the calibration marker, an area of the calibration marker, and/or the like. In such an example, the calibration image may include a digital image including a predetermined number of pixels (e.g., a predetermined pixel height and a predetermined pixel width, a predetermined image resolution, etc.), and/or individual pixels in the calibration image may be associated with predetermined positions or values in a two-dimensional image space (e.g., a predetermined x, y coordinate of a pixel, etc.).

A calibration marker may include an object associated with one or more known dimensions (e.g., a known width, a known height, a known area, etc.). For example, a calibration marker may include a medical device 108, a fiducial marker 110 (e.g., an AprilTag, etc.), and/or the like. The calibration marker may be positioned parallel to the plane of the image capture device for capturing the calibration image.

As shown in FIG. 12A, at step 1204, process 1200 includes extracting one or more features associated with a calibration marker in an image space of a calibration image. For example, user device 102 may extract one or more features associated with the calibration marker in an image space of the calibration image. As an example, the one or more features associated with the calibration marker in the image space of the calibration image may include one or more pixel dimensions of the calibration marker in the image space of the calibration image (e.g., a pixel width, a pixel height, etc.).

Figure 13:
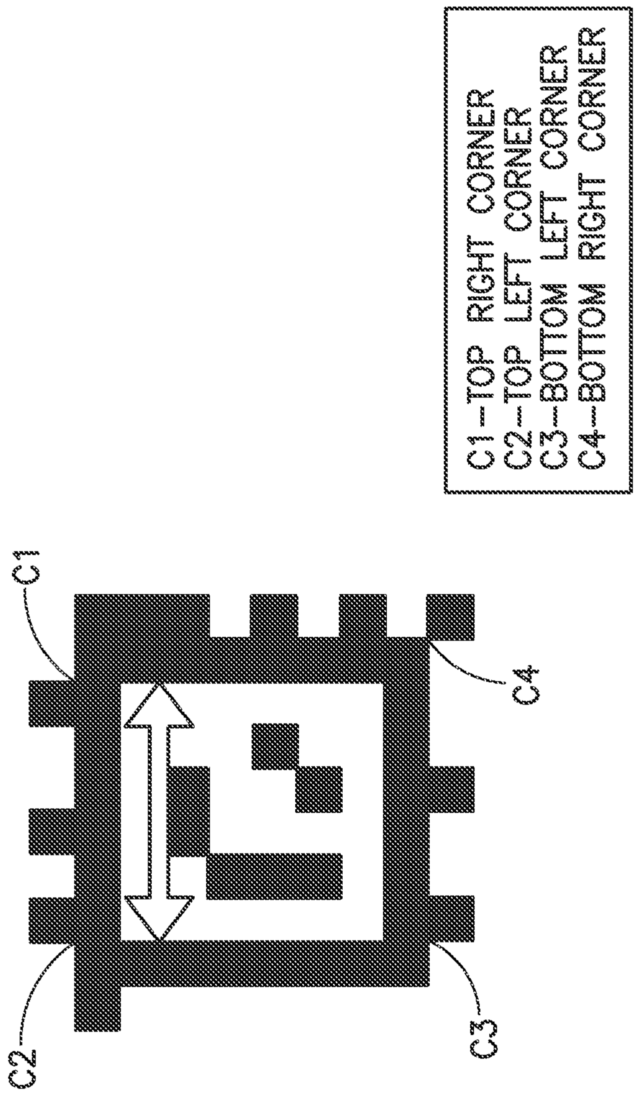
FIG. 13 is an annotated image of an example AprilTag.

User device 102 may extract the one or more features associated with the calibration marker in the image space of the calibration image by using an object recognition technique to detect a region of interest (ROI) including the calibration marker in the image and calculating a number of pixels associated with a pixel dimension P of the calibration marker in the image space of the calibration image. For example, user device 102 may determine a number of pixels between sides, edges, and/or corners of the calibration marker in the image space of the calibration image as a pixel dimension P (e.g., a pixel width, a pixel height, etc.) of the calibration marker. As an example, and referring also to FIG. 13, which is an annotated image of an example AprilTag, user device 102 may detect, using an object recognition technique (e.g., OpenCV, etc.), the AprilTag as the calibration marker in a ROI in the calibration image including a top right corner pixel C1 of the AprilTag, a top left corner pixel C2 of the AprilTag, a bottom left corner pixel C3 of the AprilTag, and/or a bottom right corner pixel C4 of the AprilTag. For example, marker detection from the AprilTag library may provide vertices of a detected marker as C1-C4 and a tag ID, and these vertices C1-C4 may be used to calculate features, such as a bounding box, a pixel distance of the marker side, a centroid of the marker, and/or the like. User device 102 may determine a right side R of the calibration marker as C1 minus C4 (e.g., R=C1−C4, etc.) and/or a left side L of the calibration marker as C2 minus C3 (e.g., L=C2−C3, etc.). User device 102 may determine the pixel dimension P, in this example case of FIG. 13 a pixel width P, of the calibration marker as a summation of the right side R of the calibration marker and the left side L of the calibration marker divided by two (e.g., P=(L+R)/2, etc.).

As shown in FIG. 12A, at step 1206, process 1200 includes determining one or more calibration parameters based on one or more features associated with a calibration marker in an image space of a calibration image, a known distance of the calibration marker from an image capture device, and/or a known dimension of the calibration marker. For example, user device 102 may determine, based on the one or more features associated with the calibration marker in the image space of the calibration image, the known distance of the calibration marker from the image capture device, and/or the known dimension of the calibration marker, one or more calibration parameters. As an example, the one or more calibration parameters may be for a distance estimation technique associated with and/or configured for the image capture device, the predetermined resolution of the image capture device used to capture the calibration image, and/or one or more adjustable camera settings used to capture the calibration image (e.g., a focal length of the image capture device if adjustable, etc.). In such an example, user device 102 may store the one or more calibration parameters (e.g., in association with the distance estimation technique, etc.). In some non-limiting embodiments, the one or more calibration parameters may be stored within user device 102 (e.g., in memory 206, in storage component 208, etc.) or external (e.g., remote from) user device 102 (e.g., within management system 104, etc.).

User device 102 may use triangle similarity geometry to determine the one or more calibration parameters of the distance estimation technique based on the one or more features associated with the calibration marker in the image space of the calibration image, the known distance of the calibration marker from the image capture device, and/or the known dimension of the calibration marker. For example, user device 102 may determine an effective focal length F associated with the image capture device as the one or more calibration parameters. As an example, user device 102 may determine the effective focal length F of the image capture device as a product of the pixel dimension P of the calibration marker (e.g., the pixel width P, the pixel height P, etc.) and the known distance D of the calibration marker from the image capture device divided by the known dimension W (e.g., the known width, the known height, etc.) of the calibration marker (e.g., F=(P×D)/W, etc.). For example, for a pixel dimension P of the calibration marker of a width of 59 pixels, a known distance D of the calibration marker from the image capture device of 30 cm, and a known width of the calibration marker of 1 cm, an effective focal length F of the image capture device may be calculated as F=(59×30)/1=1770 pixels.

As shown in FIG. 12A, at step 1208, process 1200 includes obtaining an image including an object. For example, user device 102 may obtain, from the image capture device (e.g., the image capture device of user device 102, the monocular digital camera of user device 102, etc.) an image including an object. As an example, user device 102 (e.g., the image capture device of user device 102, the monocular digital camera of user device 102, etc.) may capture an image including an object. For example, user device 102 (e.g., the image capture device of user device 102, the monocular camera of user device 102, etc.) may capture the image including the object at step 402 of process 400 and/or as part of another process separate from or including process 400, such as a standalone implementation of process 1200 for estimating object distance from an image capture device. In such an example, the image capture device used to capture the image including the object may be the same image capture device used to capture the calibration image, may have the same predetermined resolution as the image capture device used to capture the calibration image (e.g., the image may include a digital image including a same predetermined number of pixels (e.g., a same predetermined pixel height and a same predetermined pixel width, a predetermined image resolution, etc.) as the calibration image, etc.), and/or may have the same one or more adjustable camera settings used to capture the calibration image (e.g., a focal length of the image capture device if adjustable, etc.), and/or individual pixels in the image including the object may be associated with the same predetermined positions or values in a two-dimensional image space (e.g., a predetermined x, y coordinate of a pixel, etc.) as the individual pixels in the calibration image. In such an example, the image capture device may be located at a different distance from the object to capture the image including the object than the known distance of the image capture device from the calibration marker to capture the calibration image.

As shown in FIG. 12B, at step 1210, process 1200 includes extracting at least one feature associated with an object in an image space of an image. For example, user device 102 may extract at least one feature associated with the object in an image space of the image. As an example, the at least one feature associated with the object in the image space of the image may include one or more pixel dimensions of the object in the image space of the image (e.g., a pixel width, a pixel height, etc.).

User device 102 may extract the at least one feature associated with the object in the image space of the image by using an object recognition technique to detect a region of interest (ROI) including the object in the image and calculating a number of pixels associated with a pixel dimension P of the object in the image space of the image. For example, user device 102 may determine a number of pixels between sides, edges, and/or corners of the object in the image space of the image as a pixel dimension P (e.g., a pixel width, a pixel height, etc.) of the object. As an example, and referring again to FIG. 13, which is an annotated image of an example AprilTag, user device 102 may detect, using an object recognition technique (e.g., OpenCV, etc.), the AprilTag as the object in a ROI in the image including a top right corner pixel C1 of the AprilTag, a top left corner pixel C2 of the AprilTag, a bottom left corner pixel C3 of the AprilTag, and/or a bottom right corner pixel C4 of the AprilTag. User device 102 may determine a right side R of the object as C1 minus C4 (e.g., R=C1−C4, etc.) and/or a left side L of the object as C2 minus C3 (e.g., L=C2−C3, etc.). User device 102 may determine the pixel dimension P, in this example case of FIG. 13 a pixel width P, of the object as a summation of the right side R of the object and the left side L of the object divided by two (e.g., P=(L+R)/2, etc.).

As shown in FIG. 12B, at step 1212, process 1200 includes obtaining a dimension of an object. For example, user device 102 may obtain a dimension of the object. As an example, the object may include a medical device 108, a fiducial marker 110 (e.g., an AprilTag, etc.), and/or the like.

In some non-limiting embodiments or aspects, the object may be associated with one or more known dimensions (e.g., a known width, a known height, a known area, etc.). For example, user device 102 may obtain a dimension of the object by processing the image including the object using one or more object detection techniques and/or classifiers as described herein with respect to step 404 of FIG. 4 to identify a class or type of the object in the image. User device 102 may store (e.g., in a look-up table, etc.) dimensions of known classes or types of objects (e.g., dimensions of an AprilTag, dimensions of a known medical device 108, such as a specific type of needleless connector, and/or the like, etc.). For example, the dimensions of the known classes or types of objects may be stored within user device 102 (e.g., in memory 206, in storage component 208, etc.) or external (e.g., remote from) user device 102 (e.g., within management system 104, etc.). In such an example, user device 102 may obtain a dimension of the object by retrieving (e.g., from the look-up table, etc.), based on the determined class or type of the object in the image, the dimension of the object.

In some non-limiting embodiments or aspects, if user device 102 does not detect a fiducial marker in the image(s) and/or a fiducial marker associated with a detected object in the image(s), user device 102 may attempt detect non-fiducial markers of known size and estimate, using an object recognition technique (e.g., by using software packages, such as OpenCV, ZXing, and/or the like, etc.), the dimension of the detected object based on a first number of pixels associated with the detected object in the image, the known size of a detected non-fiducial marker, and a second number of pixels associated with the detected non-fiducial marker. In some non-limiting embodiments or aspects, if a non-fiducial marker with a known size is not detected in image(s), user device 102 may use the object recognition techniques to detect other components (e.g., catheter components, etc.) whose dimensions are known using the object recognition techniques.

As shown in FIG. 12B, at step 1214, process 1200 includes determining a distance of an object from an image capture device based on at least one feature associated with the object in an image space of an image, a dimension of the object, and one or more calibration parameters. For example, user device 102 may determine, based on the at least one feature associated with the object in the image space of the image, the dimension of the object, and the one or more calibration parameters, a distance of the object from the image capture device (e.g., a distance from a center of the object to a center of the image capture device, etc.). As an example, user device 102 may determine the distance D' of the object from the image capture device as a product of the dimension of the object W' (e.g., a width, etc.) and the effective focal length F of the image capture device divided by the pixel dimension P' (e.g., the pixel width, etc.) of the object in the image, for example, $D'=(W'\times F)/P'$. For example, for a pixel dimension P' of an object of a width of 35.15 pixels in an image (e.g., a left side L of 35 pixels and a right side R of 35.3 pixels, etc.), a dimension of the object of a width of 1 cm, and an effective focal length F of 1770 pixels for the image capture device, a distance D' of the object from the image capture device may be calculated as $(1\times 1770)/35.15=50.35$ cm.

In some non-limiting embodiments or aspects, the object may include a 3D object including a single marker (e.g., a fiducial marker, a non-fiducial marker, etc.) utilized to contrast a main face of the object including the marker with respect to the remaining faces of the object that do not include the marker. For example, the remaining faces of the object not including the marker may include an unmarked area or a surface, which may be a colored or uncolored surface, a textured or flat surface, and/or another surface for distinguishing the remaining or other faces from the main surface in a 2D image. As an example, user device 102 may determine, based on a percentage of the remaining faces that are visible in the image including the object, one or more angles at which the image was taken and, based on one or more angles and the known dimension(s) of the main face including the marker, determine the distance of the object from the image capture device. In such an example, user device 102 may utilize a stereo camera to estimate the object distance. For example, user device 102 may use a stereo camera to capture images from different perspective angles, and user device 102 may process the images captured from the stereo camera at the different perspective angles to determine an angular deviation between the objects, and use the angular deviation between the objects and numbers of pixels associated with the objects to determine the distance as described herein in more detail.

As shown in FIG. 12B, at step 1216, process 1200 includes providing a distance of an object from an image capture device. For example, user device 102 may provide the distance of the object from the image capture device.

Figure 14:
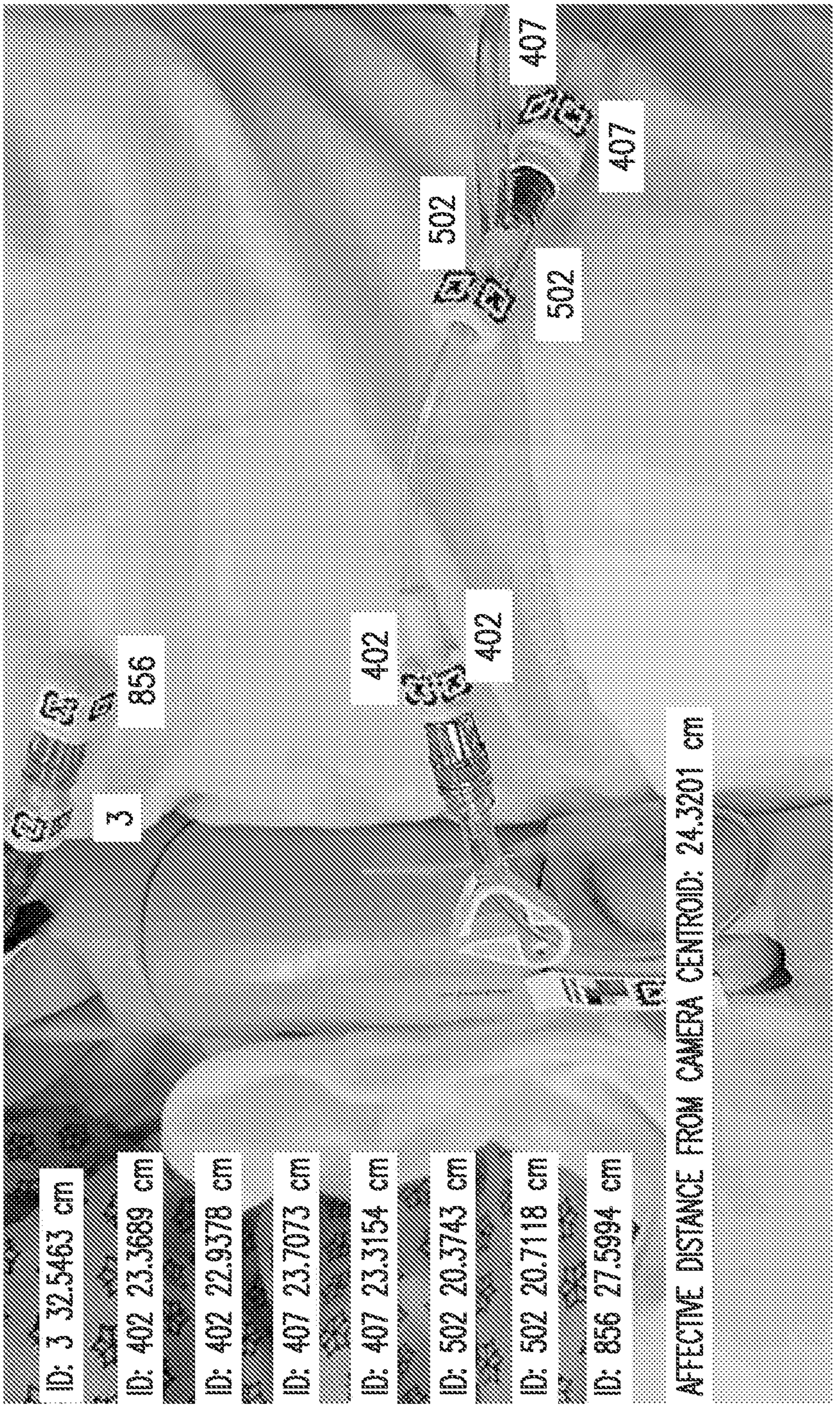
FIG. 14 illustrates an implementation of non-limiting embodiments or aspects of a display including distances of medical devices from an image capture device.

In some non-limiting embodiments or aspects, user device 102 may provide the distance of the object from the image capture device by displaying on a display of user device 102 in real-time the distance of the object from the image capture device, which may guide a user holding the user device 102 including the image capture device to keep the user device 102 within specified working distance thresholds for capturing quality images. In such an example, user device 102 may display the real-time distance of the object from the image capture device concurrently with the image captured by the image capture device (e.g., concurrently with the image used to estimate the distance of the object from the image capture device, etc.). For example, and referring also to FIG. 14, which illustrates an implementation of non-limiting embodiments or aspects of a display 1400 including distances of medical devices from an image capture device, user device 102 may provide the display 1400 including a real-time view captured by the image capture device that includes a plurality of medical devices 108 for which distances thereof from the image capture device are simultaneously displayed in association with the plurality of medical devices in the display 1400. In some non-limiting embodiments or aspects, user device 102 may provide the display 1400 simultaneously with a representation of at least one IV line including pairs of medical devices that are determined to be connected to each other as described herein with respect to step 408 of FIG. 4.

In some non-limiting embodiments or aspects, user device 102 may provide the distance of the object from the image capture device for use in one or more other processes and/or calculations described herein with respect to step 404 of FIG. 4 to determine position information associated with a three-dimensional (3D) position of a plurality of medical devices 108 relative to the image capture device and/or for use in one or more processes and/or calculations described herein with respect to step 406 of FIG. 4 to determine pairs of medical devices of the plurality of medical devices 108 that are connected to each other. For example, user device 102 may use the distance of the object from the image capture device to determine whether the object is connected to another object in the image. As an example, the object may include a medical device of the plurality of medical devices 108 and/or a fiducial marker 110 associated with a medical device of the plurality of medical devices 108. In such an example, user device 102 may determine a distance of each medical device of the plurality of medical devices 108 from the image capture device as described herein and, based on distances of a pair of medical devices from the image capture device, determine a difference in depth from the image capture device between the pair of medical devices, thereby enabling extraction of 3D position information associated with the plurality of medical devices 108.

In some non-limiting embodiments or aspects, capturing, with an image capture device, an image including an object, such as that described with respect to step 402 of process 400 in FIG. 4 and/or step 1208 of process 1200 in FIG. 12A herein, may include capturing, with a same image capture device (e.g., a same digital monocular camera, etc.), multiple images at different angles relative to one or more objects in the images. For example, these multiple images may be used in step 404 of process 400 in FIG. 4 and/or step 1214 of process 1200 in FIG. 12B as described herein to calculate object distance and/or 3D position information of the one or more objects, for example, by using a multiview depth estimation process that uses triangulation to calculate 3D position information of the one or more objects.

Figure 15:
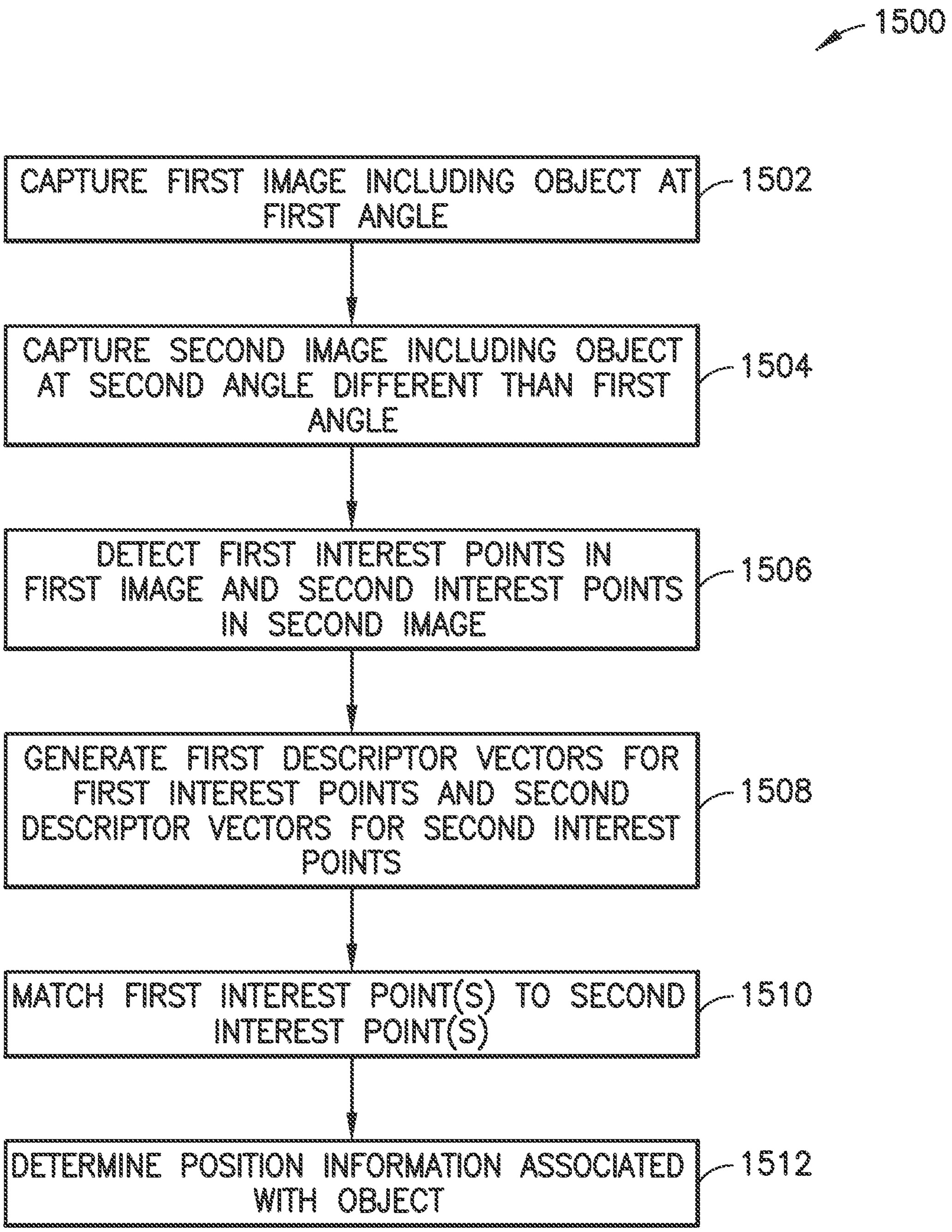
FIG. 15 is a flowchart of non-limiting embodiments or aspects of a process for estimating object distance from an image capture device.

Referring now to FIG. 15, FIG. 15 is a flowchart of non-limiting embodiments or aspects of a process 1500 for estimating object distance from an image capture device. In some non-limiting embodiments or aspects, one or more of the steps of process 1500 may be performed (e.g., completely, partially, etc.) by user device 102 (e.g., one or more devices of a system of user device 102, etc.). In some non-limiting embodiments or aspects, one or more of the steps of process 1500 may be performed (e.g., completely, partially, etc.) by another device or a group of devices separate from or including user device 102, such as management system 104 (e.g., one or more devices of management system 104, etc.).

As shown in FIG. 15, at step 1502, process 1500 includes capturing with an image capture device, a first image including an object at a first angle relative to the object. For example, user device 102 (e.g., the image capture device of user device 102, the monocular digital camera of user device 102, etc.) may capture a first image including an object at a first angle relative to the object.

Figure 16:
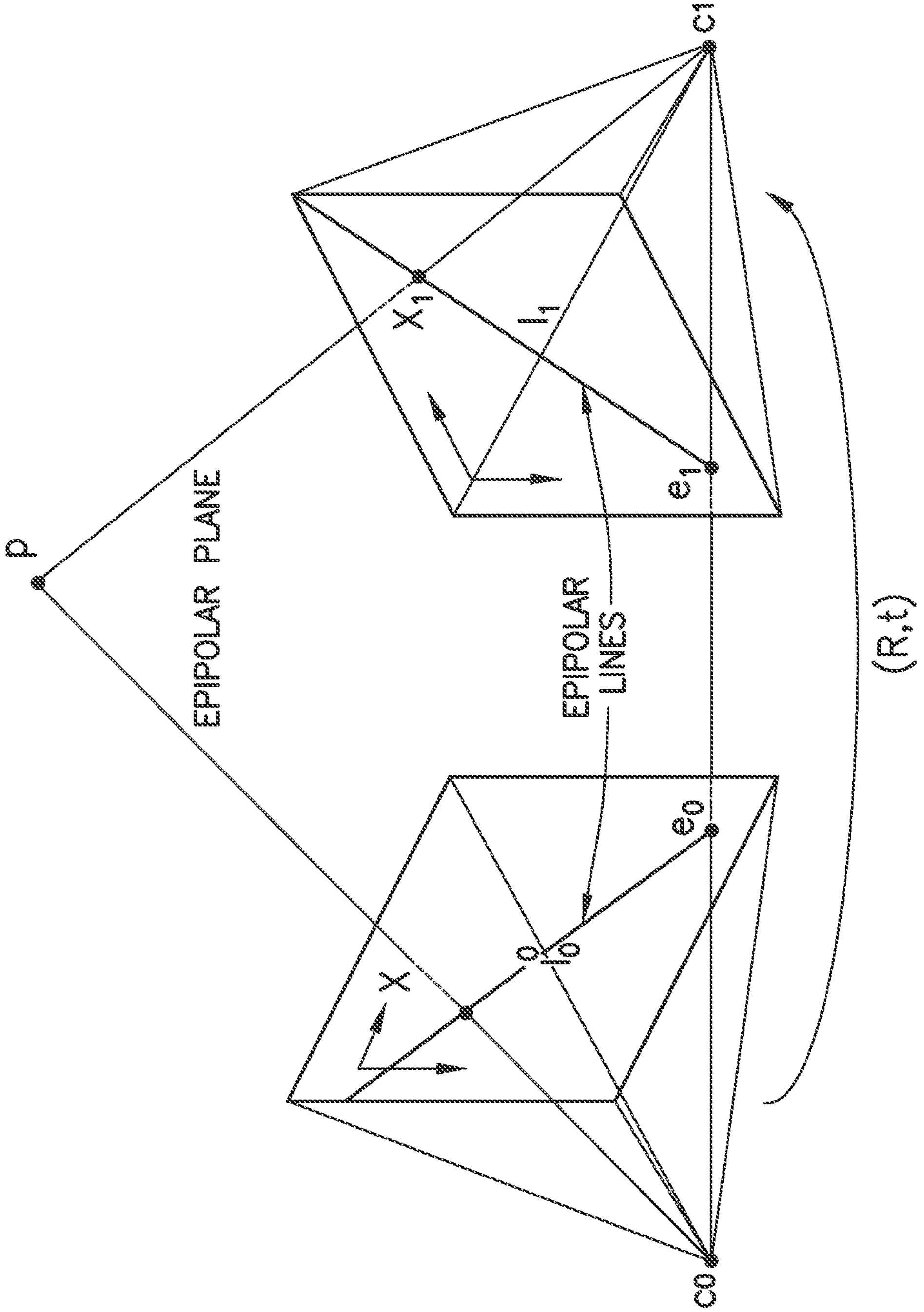
FIG. 16 illustrates an implementation of non-limiting embodiments or aspects of a multiview camera setup.

As shown in FIG. 15, at step 1504, process 1500 includes capturing with the image capture device, a second image including the object at a second angle relative to the object different than the first angle. For example, user device 102 (e.g., the image capture device of user device 102, the monocular digital camera of user device 102, etc.) may capture a second image including the object at a second angle relative to the object different than the first angle. As an example, and referring also to FIG. 16, the image capture device may be panned from location C0, at which the first image is captured, to locationC1, at which the second image is captured, relative to an object which may be located at point p in 3D space.

As shown in FIG. 15, at step 1506, process 1500 includes detecting a plurality of first interest points associated with an object in a first image and a plurality of second interest points associated with the object in a second image. For example, user device 102 may detect, using an image feature detector algorithm, a plurality of first interest points associated with the object in the first image and a plurality of second interest points associated with the object in the second image. As an example, user device 102 may use one or more image feature detector algorithms as described by Hassaballah, M., A A Abdelmgeid and Hammam A. Alshazly in the 2016 paper titled "Image Features Detection, Description and Matching", hereinafter "Hassaballah et al.", the entire contents of which are incorporated herein by reference.

As shown in FIG. 15, at step 1508, process 1500 includes generating a plurality of first descriptor vectors associated with a plurality of first interest points and a plurality of second descriptor vectors associated a the plurality of second interest points. For example, user device 102 may use an image feature descriptor algorithm, to generate a plurality of first descriptor vectors associated with the plurality of first interest points and a plurality of second descriptor vectors associated with the plurality of second interest points. As an example, user device 102 may use one or more image feature descriptor algorithms as described by Hassaballah et al.

As shown in FIG. 15, at step 1510, process 1500 includes matching at least one first interest point of a plurality of first interest points to at least one second interest point of a plurality of second interest points. For example, user device 102 may match, using a feature matching algorithm, based on the plurality of first descriptor vectors associated with the plurality of first interest points and the plurality of second descriptor vectors associated with the plurality of second interest points, at least one first interest point of the plurality of first interest points to at least one second interest point of the plurality of second interest points. As an example, user device 102 may use one or more feature matching algorithms as described by Hassaballah et al.

As shown in FIG. 15, at step 1512, process 1500 includes determining position information associated with a three-dimensional (3D) position of an object relative to an image capture device. For example, user device 102 may determine, based on the at least one first interest point of the plurality of first interest points matched to at least one second interest point of the plurality of second interest points, position information associated with a three-dimensional (3D) position of the object relative to the image capture device. As an example, user device 102 may use one or more processes or algorithms described herein with respect to step 404 of process 400 in FIG. 4 and/or step 1214 of process 1200 in FIG. 12B to calculate object distance and/or 3D position information of the one or more objects, for example, by using a multiview depth estimation process that uses triangulation of the first interest point(s) matched to the second interest point(s) to calculate 3D position information of the one or more objects.

Accordingly, non-limiting embodiments or aspects of the present disclosure may use predefined or known detected marker features and geometric and/or trigonometric properties to identify a ROI and estimate a distance between an object, such as a fiducial marker, and/or like and an image capture device, and/or apply image processing and mathematical logics to estimate the distance that are computationally less expensive compared to existing convolutional neural network (CNN)-based approaches to provide real-time computation, estimation, and output of the distance for better usability, as well as use a same single camera setup to mimic a stereo setup to capture multiview images to achieve the triangulation by Detect-Describe-Match pipelines, which may reduce the sensor load and avoid expensive stereo camera calibration computations.

Figure 17:
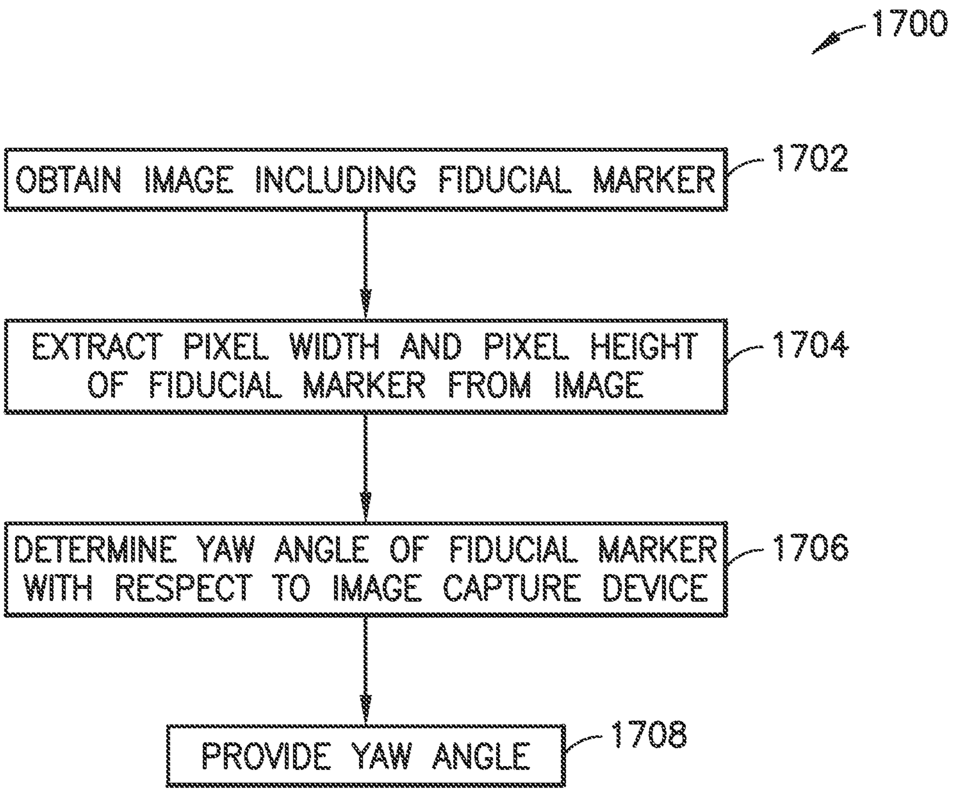
FIG. 17 is a flowchart of non-limiting embodiments or aspects of a process for estimating object yaw angle from an image capture device.

Referring now to FIG. 17, FIG. 17 is a flowchart of non-limiting embodiments or aspects of a process 1700 for estimating object yaw angle from an image capture device. In some non-limiting embodiments or aspects, one or more of the steps of process 1700 may be performed (e.g., completely, partially, etc.) by user device 102 (e.g., one or more devices of a system of user device 102, etc.). In some non-limiting embodiments or aspects, one or more of the steps of process 1700 may be performed (e.g., completely, partially, etc.) by another device or a group of devices separate from or including user device 102, such as management system 104 (e.g., one or more devices of management system 104, etc.).

As shown in FIG. 17, at step 1702, process 1700 includes obtaining an image including a fiducial marker. For example, user device 102 may obtain, from an image capture device (e.g., the image capture device of user device 102, the monocular digital camera of user device 102, etc.) an image including a fiducial marker 110 (e.g., a fiducial marker 110 attached to medical device 108, etc.). As an example, user device 102 (e.g., the image capture device of user device 102, the monocular digital camera of user device 102, etc.) may capture an image including a fiducial marker 110 (e.g., a fiducial marker 110 attached to medical device 108, etc.). For example, user device 102 (e.g., the image capture device of user device 102, the monocular camera of user device 102, etc.) may capture the image including the fiducial marker 110 at step 402 of process 400 and/or as part of another process separate from or including process 400, such as a standalone implementation of process 1700 for estimating object yaw angle from an image capture device. In such an example, the fiducial marker may have a known width and a known height. For example, the fiducial marker may include an AprilTag.

As shown in FIG. 17, at step 1704, process 1700 includes extracting a pixel width and a pixel height of a fiducial marker from an image. For example, user device 102 may extract a pixel width and a pixel height of the fiducial marker 110 in the image space of the image.

User device 102 may extract the pixel width and the pixel height of the fiducial marker from the image by using an object recognition technique to detect a region of interest (ROI) including the fiducial marker 110 in the image and calculating a number of pixels associated with the pixel width and the pixel height of the fiducial marker 110 in the image space of the image. For example, user device 102 may determine a number of pixels between sides, edges, and/or corners of the object in the image space of the image as a pixel dimension P (e.g., a pixel width, a pixel height, etc.) of the object. As an example, and referring again to FIG. 13, which is an annotated image of an example AprilTag, user device 102 may detect, using an object recognition technique (e.g., OpenCV, etc.), the AprilTag as the object in a ROI in the image including a top right corner pixel C1 of the AprilTag, a top left corner pixel C2 of the AprilTag, a bottom left corner pixel C3 of the AprilTag, and/or a bottom right corner pixel C4 of the AprilTag. User device 102 may determine a right side R of the fiducial marker 110 as C1 minus C4 (e.g., R=C1−C4, etc.) and/or a left side L of the fiducial marker 110 as C2 minus C3 (e.g., L=C2−C3, etc.). User device 102 may determine the pixel width $P_w$ of the fiducial marker 110 as a summation of the right side R of the calibration marker and the left side L of the calibration marker divided by two (e.g., $P_w$=(L+R)/2, etc.). User device 102 may determine a top side T of the fiducial marker 110 as C2 minus C1 (e.g., T=C2−C1, etc.) and/or a bottom side B of the fiducial marker 110 as C3 minus C4 (e.g., B=C3−

C4, etc.). User device 102 may determine the pixel height $P_h$ of the fiducial marker 110 as a summation of the top side of the fiducial marker 110 and the bottom side of the fiducial marker 110 divided by two (e.g., $P_h=(T+B)/2$, etc.).

As shown in FIG. 17, at step 1706, process 1700 includes determining a yaw angle of a fiducial marker with respect to an image capture device. For example, user device 102 may estimate, based on the pixel width, the pixel height, and the known width, and the known height, a yaw angle of the fiducial marker with respect to the image capture device. As an example, user device 102 may estimate the yaw angle of the fiducial marker with respect to the image capture device according to the following Equation (1):

$$\text{Yaw Angle} = \alpha * \beta \quad (1)$$

where β is a multiplying factor, and α is determined according to the following Equation (2):

$$\alpha = \left( (w_k/h_k) - (w_p/h_p) \right) * 90 \quad (2)$$

where $w_k$ is the known width of the fiducial marker, $h_k$ is the known height of the fiducial marker, $w_p$ is the pixel width of the fiducial marker in the image space of the image, and $h_p$ is the pixel height of the fiducial marker in the image space of the image. In some non-limiting embodiments or aspects, a ratio of the known width of the fiducial marker $w_k$ to the known height of the fiducial marker $h_k$ is one-to-one. For example, the ratio of the known width of the fiducial marker $w_k$ to the known height $h_k$ of an AprilTag used as the fiducial marker is one-to-one.

The multiplying factor β (e.g., a weightage factor, etc.) may be determined from a plurality of pre-stored multiplying factors according to a ratio of the pixel width $w_p$ to the pixel height $h_p$. For example, user device 102 may retrieve a value of the multiplying factor β from a look-up table including the plurality of pre-stored multiplying factors determined according to a ratio of the pixel width $w_p$ to the pixel height $h_p$. As an example, Table 1 below includes the ratios of width and height of tags for the multiplying factor β calculated for tags at different angles and distances. GT in Table 1 refers to ground truth.

TABLE 1

| GT Angle | GT Distance | Avg Ratio | β |
|---|---|---|---|
| 0 | 30-70 | 0.97 | NA |
| 10 | 30-70 | 0.95 | 3.2 |
| 20 | 30-70 | 0.91 | 2.8 |
| 30 | 30-70 | 0.84 | 2.24 |
| 40 | 30-70 | 0.75 | 1.82 |
| 50 | 30-70 | 0.62 | 1.51 |
| 60 | 30-70 | 0.49 | 1.31 |
| 70 | 30-70 | 0.33 | 1.17 |

As shown in FIG. 17, at step 1708, process 1700 includes providing a yaw angle of a fiducial marker with respect to an image capture device. For example, user device 102 may provide the yaw angle of the fiducial marker 110 with respect to the image capture device.

In some non-limiting embodiments or aspects, user device 102 may provide the yaw angle of the fiducial marker 110 from the image capture device by displaying on a display of user device 102 in real-time the yaw angle of the fiducial marker 110 from the image capture device, which may guide a user holding the user device 102 including the image capture device to keep the user device 102 within specified working angle thresholds for capturing quality images. In such an example, user device 102 may display the real-time yaw angle of the fiducial marker 110 from the image capture device concurrently with the image captured by the image capture device (e.g., concurrently with the image used to estimate the distance of the fiducial marker 110 from the image capture device, etc.). For example, user device 102 may provide a display including a real-time view captured by the image capture device that includes a plurality of medical devices 108 with corresponding fiducial markers 110 for which distances and/or yaw angles thereof from the image capture device are simultaneously displayed in association with the plurality of medical devices 108 in the display. In some non-limiting embodiments or aspects, user device 102 may provide the display simultaneously with a representation of at least one IV line including pairs of medical devices that are determined to be connected to each other as described herein with respect to step 408 of FIG. 4.

In some non-limiting embodiments or aspects, user device 102 may provide the yaw angle of the fiducial marker 110 from the image capture device for use in one or more other processes and/or calculations described herein with respect to step 404 of FIG. 4 to determine position information associated with a three-dimensional (3D) position of a plurality of medical devices 108 and/or corresponding fiducial markers 110 thereof relative to the image capture device and/or for use in one or more processes and/or calculations described herein with respect to step 406 of FIG. 4 to determine pairs of medical devices of the plurality of medical devices 108 that are connected to each other. For example, user device 102 may use the yaw angle of the fiducial marker 110 from the image capture device and/or relative to another fiducial marker 110 to determine whether the medical device 108 including the fiducial marker 110 is connected to another medical device 108 including the other fiducial marker 110 in the image. As an example, the fiducial marker 110 may be associated with a medical device of the plurality of medical devices 108, and user device 102 may determine a yaw angle of each medical device of the plurality of medical devices 108 from the image capture device as described herein, thereby enabling extraction of 3D position information associated with the plurality of medical devices 108.

Figure 18:
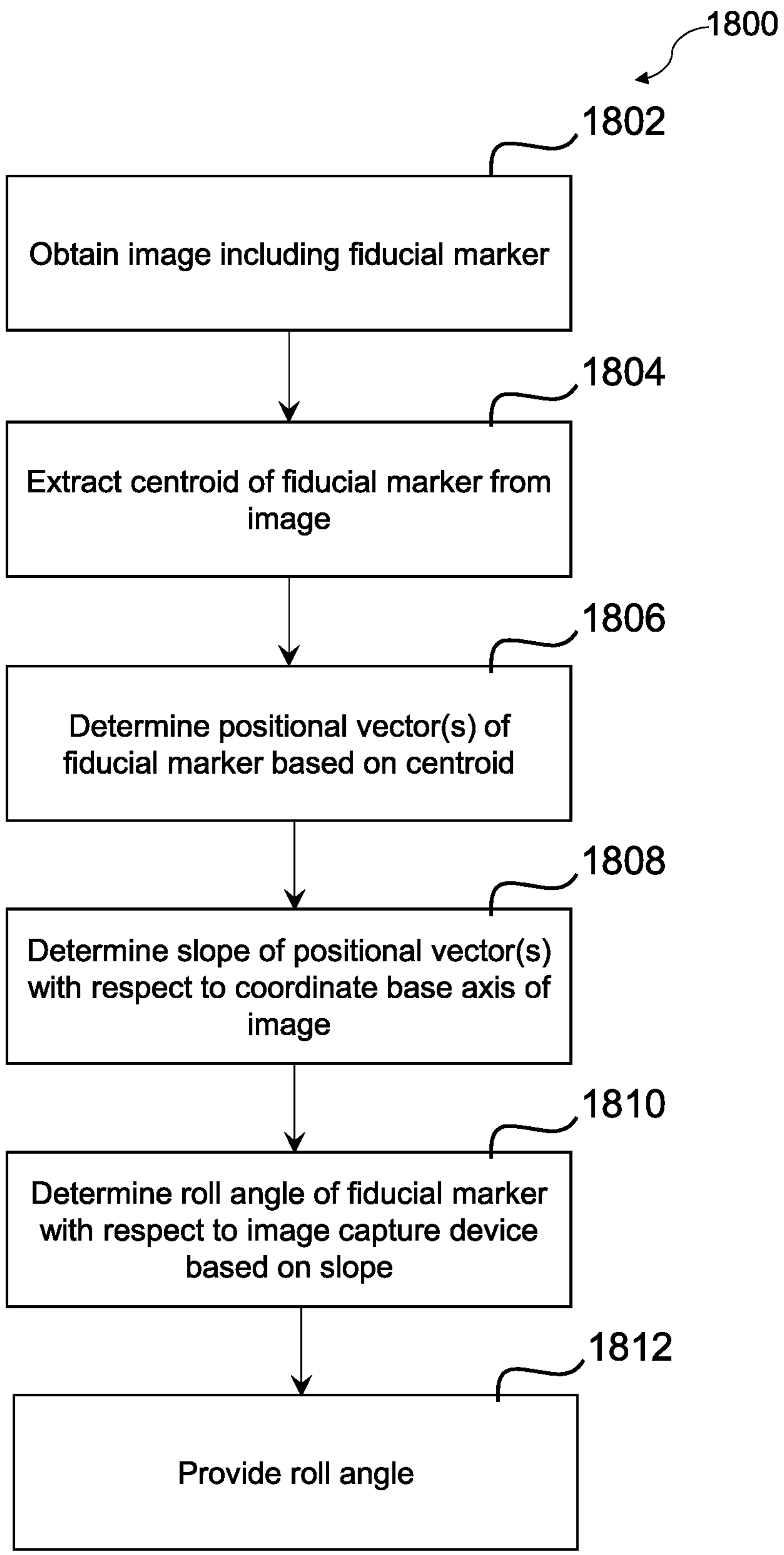
FIG. 18 is a flowchart of non-limiting embodiments or aspects of a process for estimating object roll angle from an image capture device.

Referring now to FIG. 18, FIG. 18 is a flowchart of non-limiting embodiments or aspects of a process 1800 for estimating object roll angle from an image capture device. In some non-limiting embodiments or aspects, one or more of the steps of process 1800 may be performed (e.g., completely, partially, etc.) by user device 102 (e.g., one or more devices of a system of user device 102, etc.). In some non-limiting embodiments or aspects, one or more of the steps of process 1800 may be performed (e.g., completely, partially, etc.) by another device or a group of devices separate from or including user device 102, such as management system 104 (e.g., one or more devices of management system 104, etc.).

As shown in FIG. 18, at step 1802, process 1800 includes obtaining an image including a fiducial marker. For example, user device 102 may obtain, from an image capture device (e.g., the image capture device of user device 102, the monocular digital camera of user device 102, etc.) an image including a fiducial marker 110 (e.g., a fiducial marker 110 attached to medical device 108, etc.). As an example, user device 102 (e.g., the image capture device of user device 102, the monocular digital camera of user device 102, etc.) may capture an image including a fiducial marker 110 (e.g., a fiducial marker 110 attached to medical device 108, etc.). For example, user device 102 (e.g., the image capture device of user device 102, the monocular camera of user device 102, etc.) may capture the image including the fiducial marker 110 at step 402 of process 400 and/or as part of another process separate from or including process 400, such as a standalone implementation of process 1800 for estimating object roll angle from an image capture device. In such an example, the fiducial marker may have a known width and a known height. For example, the fiducial marker may include an AprilTag.

As shown in FIG. 18, at step 1804, process 1800 includes extracting a centroid associated with a fiducial marker in an image space of an image. For example, user device 102 may extract a centroid associated with fiducial marker 110 in an image space of the image.

User device 102 may extract the one or more features associated with fiducial marker 110 in the image space of the image by using an object recognition technique to detect a region of interest (ROI) including the fiducial marker in the image and calculating a number of pixels associated with a pixel dimension P of fiducial marker 110 in the image space of the image. For example, user device 102 may determine a number of pixels between sides, edges, and/or corners of fiducial marker 110 in the image space of the image. As an example, and referring also to FIG. 19A, which is an annotated image of a square or rectangle representing an area between corners of an AprilTag ordered in a clockwise direction, user device 102 may detect, using an object recognition technique (e.g., OpenCV, etc.), the AprilTag as fiducial marker 110 in a ROI in the image including a top left corner pixel C1 of the AprilTag, a top right corner pixel C2 of the AprilTag, a bottom right corner pixel C3 of the AprilTag, and/or a bottom left corner pixel C4 of the AprilTag. For example, marker detection from the AprilTag library may provide vertices of a detected marker as C1-C4 and a tag ID, and these corners C1-C4 may be used to calculate features, such as a bounding box, a pixel distance of the marker side, a centroid of the marker, and/or the like. User device 102 may determine a centroid of the AprilTag as at a distance of one-half its height and one-half its base or width. For example, user device 102 may determine a y-centroid coordinate of the AprilTag as C1 minus C4 divided by two (e.g., Y_bar=H/2=(C1−C4)/2, etc.) and/or an x-centroid coordinate of the AprilTag as C3 minus C4 divided by two (e.g., X_bar=B/2=(C3−C4)/2, etc.).

As shown in FIG. 18, at step 1806, process 1800 includes determining, based on a centroid of a fiducial marker in an image space of an image, a positional vector of the fiducial marker. For example, user device 102 may determine, based on the centroid of fiducial marker 110 in the image space of the image, the known width of the fiducial marker, and/or the known height of the fiducial marker, a positional vector of fiducial marker 110. As an example, user device 102 may use the centroid to calculate positional vectors x, y, and/or z of fiducial marker 110 by calculating a Euclidian distance between the centroid and a midpoint of a side of fiducial marker 110 in the image space of the image (e.g., X_bar or W/2, Y_bar or H/2, etc.), which may provide a pixel length or distance and/or a direction of the x, y, and z positional vectors.

Referring again to FIG. 19A, user device 102 may calculate, for each of the corners C1-C4, orientation axes and centers. For example, and referring also to FIG. 19B, which is a graph of points forming the square or rectangle representing the area between the corners of the AprilTag of FIG. 19A, for the corners C1-C4 ordered in the clockwise direction, to compute a x-positional vector and a y-positional vector for identifying an orientation of the AprilTag, the points that form the square or rectangle on the x and y axes may be used. As an example, a center or centroid calculation may include an average of each points (C1, C2, C3, C4) corresponding to each corner of the AprilTag, which may be [(0,1)+ (1,1)+ (1,0)+ (0,0)]/4=(0.5,0.5) in the example of FIG. 19B. A difference of points, for example, C1−C4 and C2−C3, may point to a projection on the y-axis. For example, the y-positional vector or yVec may include a sum of the difference of points, which may be [(0,1)−(0,0)]+ [(1, 1)−(1,0)]=(0,2) in the example of FIG. 19B. Similarly, a difference of points, for example C2−C1 and C3−C4, may point to a projection on the x-axis. For example, the x-positional vector or xVec may include a sum of the difference of points, which may be [(1,1)−(0,1)]+ [(1,0)−(0,0)]=(2,0) in the example of FIG. 19B.

Figure 19A:
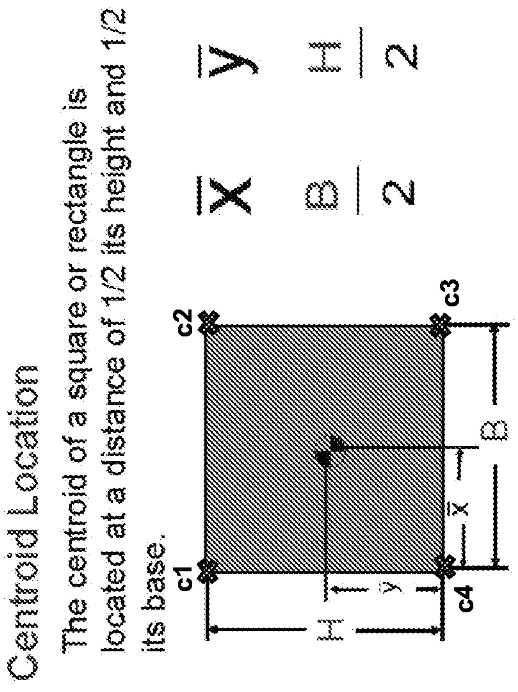
FIG. 19A is an annotated image of a square or rectangle representing an area between corners of an AprilTag ordered in a clockwise direction.
Figure 19B:
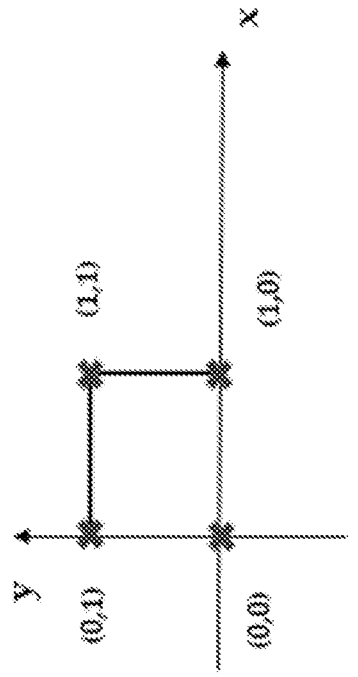
FIG. 19B is a graph of points forming the square or rectangle representing the area between the corners of the AprilTag of FIG. 19A.
Figure 19C:
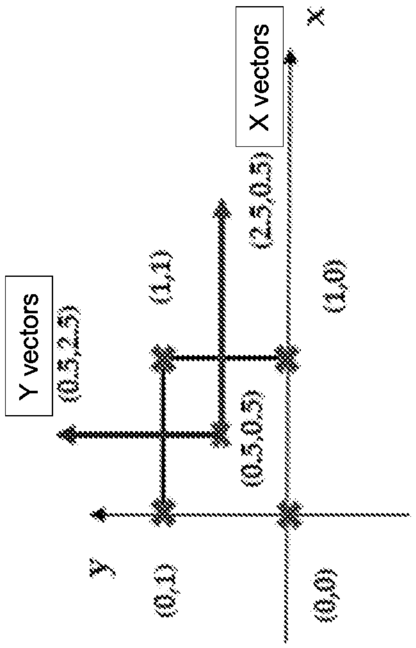
FIG. 19C is a graph of orientation axes of the AprilTag of FIGS. 19A and 19B.

Referring also to FIG. 19C, which is a graph of orientation axes of the AprilTag of FIGS. 19A and 19B, user device 102 may stack the center calculation, the y-positional vector or yVec, and the x-positional vector or xVec in a N×2×3 array (e.g., in a tagCore array data structure) using np.dstack to return a combined array index by index where [:,:,0]=center, [:,:,1]=yVec, and [:,:,2]=xVec, and draw the corresponding yVec and xVec by adding to the center point in the image (e.g., cv2.line(im, center+yVec.astype('int'),center,(255, 0, 0), int(2*im.shape[0]/1000)), cv2.line(im, center+xVec.astype('int'),center, (0, 0, 255), int(2*im.shape[0]/1000)), etc.). For example, as shown in FIG. 19C, user device 102 may draw a line between the (center+yVec) and center for the y orientation, for example, between (0.5, 2.5) and (0.5, 0.5) in the example of FIG. 19C, and/or draw a line joining (center+xVec) and center for the x orientation, for example, between (2.5, 0.5) and (0.5, 0.5) in the example of FIG. 19C.

As shown in FIG. 18, at step 1808, process 1800 includes determining a slope of a positional vector of a fiducial marker with respect to a coordinate base axis of an image including the fiducial marker. For example, user device 102 may determine a slope of the positional vector of fiducial marker 110 with respect to a coordinate base axis of the image including fiducial marker 110. As an example, and referring also to FIG. 20A, which illustrates a coordinate base axis of an image including AprilTags, the x-positional vector or xVec may be compared to the x-axis of the image including fiducial marker 110. In such an example, slope of the positional vector of fiducial marker 110 with respect to a coordinate base axis of the image including fiducial marker 110 may be determined according to the following Equation (3)

$$\text{Slope} = (y2 - y1)/(x2 - x1) \tag{3}$$

where x1, y1 are coordinates of a first point at a first end of a straight line or positional vector, and x2, y2 are coordinates of a second point at a second end of the straight line or positional vector (e.g., between the centroid and a y-positional vector point, between the centroid and an x-positional vector point, etc.).

Figure 20B:
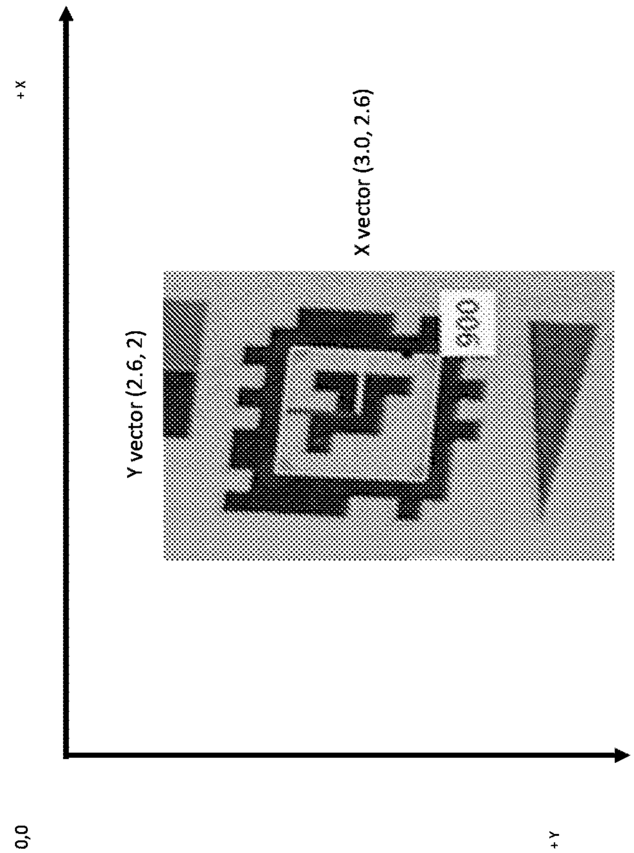
FIG. 20B illustrates example x and y vectors of an AprilTag with respect to a coordinate base axis of an image.
Figure 20A:
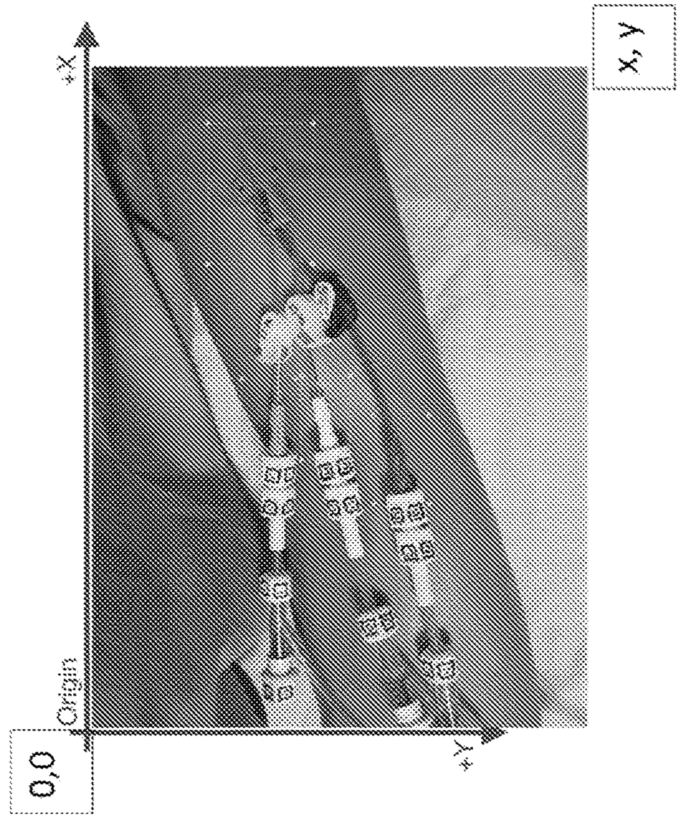
FIG. 20A illustrates a coordinate base axis of an image including AprilTags.

For example, and referring also to FIG. 20B, which illustrates example x-positional and y-positional vectors of an AprilTag with respect to a coordinate base axis of an image, for an example scenario in which a tilted AprilTag is detected with an x-positional vector (3.0, 2.6) and a y-positional vector (2.6, 2.0) and a centroid at (2.5, 2.5). To calculate the slope, the centroid and y-positional vector may be considered, such that (2.5, 2.5)=(x2, y2) and (2.6, 2.0)=(x1, y1), resulting in a Slope=−5

As shown in FIG. 18, at step 1810, process 1800 includes determining a roll angle of a fiducial marker with respect to an image capture device based on a slope of a positional vector of the fiducial marker. For example, user device 102 may determine, based on the slope of the positional vector of fiducial marker 110 with respect to the coordinate base axis of the image, a roll angle of fiducial marker 110 with respect to the image capture device. As an example, a roll angle of fiducial marker 110 with respect to the image capture device may be determined according to the following Equation (4):

$$\text{Roll Angle} = \tan^{1}(\text{Slope}). \tag{4}$$

For example, and referring again to FIG. 20B, for the example scenario in which a tilted AprilTag is detected with the x-positional vector (3.0, 2.6), the y-positional vector (2.6, 2.0), the centroid at (2.5, 2.5), and the calculated Slope=−5, the roll angle may be calculated as Roll Angle=78.7 degrees.

As shown in FIG. 18, at step 1812, process 1800 includes providing a roll angle of a fiducial marker with respect to an image capture device. For example, user device 102 may provide the roll angle of the fiducial marker 110 with respect to the image capture device.

In some non-limiting embodiments or aspects, user device 102 may provide the roll angle of the fiducial marker 110 from the image capture device by displaying on a display of user device 102 in real-time, the roll angle of the fiducial marker 110 from the image capture device, which may guide a user holding the user device 102 including the image capture device to keep the user device 102 within specified working angle thresholds for capturing quality images. In such an example, user device 102 may display the real-time roll angle of the fiducial marker 110 from the image capture device concurrently with the image captured by the image capture device (e.g., concurrently with the image used to estimate the distance of the fiducial marker 110 from the image capture device, etc.). For example, user device 102 may provide a display including a real-time view captured by the image capture device that includes a plurality of medical devices 108 with corresponding fiducial markers 110 for which distances, yaw angles, and/or roll angles thereof from the image capture device are simultaneously displayed in association with the plurality of medical devices 108 in the display. In some non-limiting embodiments or aspects, user device 102 may provide the display simultaneously with a representation of at least one IV line including pairs of medical devices that are determined to be connected to each other as described herein with respect to step 408 of FIG. 4.

In some non-limiting embodiments or aspects, user device 102 may provide the roll angle of the fiducial marker 110 from the image capture device for use in one or more other processes and/or calculations described herein with respect to step 404 of FIG. 4 to determine position information associated with a three-dimensional (3D) position of a plurality of medical devices 108 and/or corresponding fiducial markers 110 thereof relative to the image capture device and/or for use in one or more processes and/or calculations described herein with respect to step 406 of FIG. 4 to determine pairs of medical devices of the plurality of medical devices 108 that are connected to each other. For example, user device 102 may use the roll angle of the fiducial marker 110 from the image capture device and/or relative to another fiducial marker 110 to determine whether the medical device 108 including the fiducial marker 110 is connected to another medical device 108 including the other fiducial marker 110 in the image. As an example, the fiducial marker 110 may be associated with a medical device of the plurality of medical devices 108, and user device 102 may determine a roll angle of each medical device of the plurality of medical devices 108 from the image capture device as described herein, thereby enabling extraction of 3D position information associated with the plurality of medical devices 108.

In some non-limiting embodiments or aspects, user device 102 may determine and/or provide a distance of fiducial marker 110 from the image capture device, a yaw angle of fiducial marker 110 with respect to the image capture device, and/or a roll angle of fiducial marker 110 with respect to the image capture device. For example, user device 102 may provide the distance of fiducial marker 110 from the image capture device, the yaw angle of fiducial marker 110 with respect to the image capture device, and/or the roll angle of fiducial marker 110 with respect to the image capture device by displaying, on a display, concurrently with the image including fiducial marker 110, the distance of fiducial marker 110 from the image capture device, the yaw angle of fiducial marker 110 with respect to the image capture device, and/or the roll angle of fiducial marker 110 with respect to the image capture device. As an example, user device 102 may provide the distance of fiducial marker 110 from the image capture device, the yaw angle of fiducial marker 110 with respect to the image capture device, and the roll angle of fiducial marker 110 with respect to the image capture device by using the distance of fiducial marker 110 from the image capture device, the yaw angle of fiducial marker 110 with respect to the image capture device, and the roll angle of fiducial marker 110 with respect to the image capture device to determine whether a medical device associated with fiducial marker 110 is connected to another medical device (which may be associated with another fiducial marker) in the image.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, many of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A system, comprising:

at least one processor coupled to a memory and programmed and/or configured to:

obtain a calibration image including a calibration marker, wherein the calibration image including the calibration marker is captured by an image capture device with the calibration marker located at a known distance from the image capture device, and wherein the calibration marker has a known dimension;

extract one or more features associated with the calibration marker in an image space of the calibration image;

determine, based on the one or more features associated with the calibration marker in the image space of the calibration image, the known distance of the calibration marker from the image capture device, and the known dimension of the calibration marker, one or more calibration parameters;

obtain an image including an object, wherein the image including the object is captured by the image capture device;

extract at least one feature associated with the object in an image space of the image;

obtain a dimension of the object;

determine, based on the at least one feature associated with the object in the image space of the image, the dimension of the object, and the one or more calibration parameters, the distance of the object from the image capture device; and provide the distance of the object from the image capture device, wherein the one or more features associated with the calibration marker in the image space of the calibration image include a pixel dimension of the calibration marker in the image space of the calibration image, and wherein the one or more calibration parameters include an effective focal length associated with the image capture device, wherein the effective focal length is determined according to the following Equation:

$$F = (P \times D)/W$$

where F is the effective focal length, P is the pixel dimension of the calibration marker in the image space of the calibration image, D is the known distance of the calibration marker from the image capture device, and W is the known dimension of the calibration marker.

2. The system of claim 1, wherein the at least one feature associated with the object in the image space of the image includes the pixel dimension of the object in the image space of the image.

3. The system of claim 2, wherein the at least one processor is programmed and/or configured to obtain the dimension of the object by:

storing, in a memory, a plurality of dimensions associated with a plurality of types of objects;

determining, based on the image, a type of the object; and determining, based on the type of the object, the dimension of the object from the plurality of dimensions associated with the plurality of types of objects.

4. The system of claim 2, wherein the at least one processor is programmed and/or configured to obtain the dimension of the object by estimating, based on a number of pixels associated with the object in the image, the known dimension of at least one other object, and a number of pixels associated with the at least one other object in the image, the dimension of the object.

5. The system of claim 1, wherein the at least one processor is programmed and/or configured to provide the distance of the object from the image capture device by displaying, on a display, the distance of the object from the image capture device concurrently with the image including the object.

6. The system of claim 1, wherein the at least one processor is programmed and/or configured to provide the distance of the object from the image capture device by using the distance of the object from the image capture device to determine whether the object is connected to another object in the image.

7. A system, comprising:

at least one processor coupled to a memory and programmed and/or configured to:

obtain a calibration image including a calibration marker, wherein the calibration image including the calibration marker is captured by an image capture device with the calibration marker located at a known distance from the image capture device, and wherein the calibration marker has a known dimension;

extract one or more features associated with the calibration marker in an image space of the calibration image;

determine, based on the one or more features associated with the calibration marker in the image space of the calibration image, the known distance of the calibration marker from the image capture device, and the known dimension of the calibration marker, one or more calibration parameters;

obtain an image including an object, wherein the image including the object is captured by the image capture device;

extract at least one feature associated with the object in an image space of the image;

obtain a dimension of the object;

determine, based on the at least one feature associated with the object in the image space of the image, the dimension of the object, and the one or more calibration parameters, the distance of the object from the image capture device; and provide the distance of the object from the image capture device, wherein the at least one processor is programmed and/or configured to determine the distance of the object from the image capture device according to the following Equation:

$$D' = (W' \times F)/P'$$

where D' is the distance of the object from the image capture device, W' is the dimension of the object, F is the effective focal length, and P' is the pixel dimension of the object in the image space of the image.

8. A system, comprising:

at least one processor coupled to a memory and programmed and/or configured to:

obtain a calibration image including a calibration marker, wherein the calibration image including the calibration marker is captured by an image capture device with the calibration marker located at a known distance from the image capture device, and wherein the calibration marker has a known dimension;

extract one or more features associated with the calibration marker in an image space of the calibration image;

determine, based on the one or more features associated with the calibration marker in the image space of the calibration image, the known distance of the calibration marker from the image capture device, and the known dimension of the calibration marker, one or more calibration parameters;

obtain an image including an object, wherein the image including the object is captured by the image capture device;

extract at least one feature associated with the object in an image space of the image;

obtain a dimension of the object;

determine, based on the at least one feature associated with the object in the image space of the image, the dimension of the object, and the one or more calibration parameters, the distance of the object from the image capture device; and provide the distance of the object from the image capture device, wherein the at least one processor is programmed and/or configured to obtain the image including the object by:

obtaining a first image including the object captured by the image capture device at a first angle relative to the object;

obtaining a second image including the object captured by the image capture device at a second angle relative to the object different than the first angle, wherein the at least one processor is programmed and/or configured to extract the at least one feature associated with the object in the image space of the image by:

detecting, using an image feature detector algorithm, a plurality of first interest points associated with the object in the first image and a plurality of second interest points associated with the object in the second image;

generating, using an image feature descriptor algorithm, a plurality of first descriptor vectors associated with the plurality of first interest points and a plurality of second descriptor vectors associated with the plurality of second interest points;

matching, using a feature matching algorithm, based on the plurality of first descriptor vectors associated with the plurality of first interest points and the plurality of second descriptor vectors associated with the plurality of second interest points, at least one first interest point of the plurality of first interest points to at least one second interest point of the plurality of second interest points; and determining, based on the at least one first interest point of the plurality of first interest points matched to at least one second interest point of the plurality of second interest points, position information associated with a three-dimensional position of the object relative to the image capture device.

9. A method, comprising:

calibrating an image capture device by:

capturing, with the image capture device, with a calibration marker having a known dimension located at a known distance from the image capture device, a calibration image including the calibration marker;

extracting, with at least one processor, one or more features associated with the calibration marker in an image space of the calibration image;

determining, with the at least one processor, based on the one or more features associated with the calibration marker in the image space of the calibration image, the known distance of the calibration marker from the image capture device, and the known dimension of the calibration marker, one or more calibration parameters; and estimating a distance of an object from the image capture device by:

capturing, with the image capture device, an image including the object;

extracting, with the at least one processor, at least one feature associated with the object in the image space of the image;

obtaining, with the at least one processor, a dimension of the object;

determining, with the at least one processor, based on the at least one feature associated with the object in the image space of the image, the dimension of the object, and the one or more calibration parameters, the distance of the object from the image capture device; and providing, with the at least one processor, the distance of the object from the image capture device, wherein the one or more features associated with the calibration marker in the image space of the calibration image include a pixel dimension of the calibration marker in the image space of the calibration image, and wherein the one or more calibration parameters include an effective focal length associated with the image capture device, wherein the effective focal length is determined according to the following Equation:

$$F = (P \times D)/W$$

where F is the effective focal length, P is the pixel dimension of the calibration marker in the image space of the calibration image, D is the known distance of the calibration marker from the image capture device, and W is the known dimension of the calibration marker.

10. The method of claim 9, wherein the at least one feature associated with the object in the image space of the image includes the pixel dimension of the object in the image space of the image.

11. The method of claim 10, wherein obtaining the dimension of the object includes:

storing, in a memory, a plurality of dimensions associated with a plurality of types of objects;

determining, based on the image, a type of the object; and determining, based on the type of the object, the dimension of the object from the plurality of dimensions associated with the plurality of types of objects.

12. The method of claim 10, wherein obtaining the dimension of the object includes estimating, based on a number of pixels associated with the object in the image, a known dimension of at least one other object, and a number of pixels associated with the at least one other object in the image, the dimension of the object.

13. The method of claim 9, wherein providing the distance of the object from the image capture device includes at least one of:

displaying, on a display, the distance of the object from the image capture device concurrently with the image including the object;

using the distance of the object from the image capture device to determine whether the object is connected to another object in the image;

or any combination thereof.

14. A method, comprising:

calibrating an image capture device by:

capturing, with the image capture device, with a calibration marker having a known dimension located at a known distance from the image capture device, a calibration image including the calibration marker;

extracting, with at least one processor, one or more features associated with the calibration marker in an image space of the calibration image;

determining, with the at least one processor, based on the one or more features associated with the calibration marker in the image space of the calibration image, the known distance of the calibration marker from the image capture device, and the known dimension of the calibration marker, one or more calibration parameters; and estimating a distance of an object from the image capture device by:

capturing, with the image capture device, an image including the object;

extracting, with the at least one processor, at least one feature associated with the object in an image space of the image;

obtaining, with the at least one processor, a dimension of the object;

determining, with the at least one processor, based on the at least one feature associated with the object in the image space of the image, the dimension of the object, and the one or more calibration parameters, the distance of the object from the image capture device; and providing, with the at least one processor, the distance of the object from the image capture device, wherein the distance of the object from the image capture device is determined according to the following Equation:

$$D' = (W' \times F)/P'$$

where D' is the distance of the object from the image capture device, W' is the dimension of the object, F is the effective focal length, and P' is the pixel dimension of the object in the image space of the image.

15. A method, comprising:

calibrating an image capture device by:

capturing, with the image capture device, with a calibration marker having a known dimension located at a known distance from the image capture device, a calibration image including the calibration marker;

extracting, with at least one processor, one or more features associated with the calibration marker in an image space of the calibration image;

determining, with the at least one processor, based on the one or more features associated with the calibration marker in the image space of the calibration image, the known distance of the calibration marker from the image capture device, and the known dimension of the calibration marker, one or more calibration parameters; and estimating a distance of an object from the image capture device by:

capturing, with the image capture device, an image including the object;

extracting, with the at least one processor, at least one feature associated with the object in an image space of the image;

obtaining, with the at least one processor, a dimension of the object;

determining, with the at least one processor, based on the at least one feature associated with the object in the image space of the image, the dimension of the object, and the one or more calibration parameters, the distance of the object from the image capture device; and providing, with the at least one processor, the distance of the object from the image capture device, wherein capturing, with the image capture device, the image including the object includes:

capturing with the image capture device, a first image including the object at a first angle relative to the object;

capturing, with the image capture device, a second image including the object at a second angle relative to the object different than the first angle, wherein extracting, with the at least one processor, the at least one feature associated with the object in the image space of the image includes:

detecting, using an image feature detector algorithm, a plurality of first interest points associated with the object in the first image and a plurality of second interest points associated with the object in the second image;

generating, using an image feature descriptor algorithm, a plurality of first descriptor vectors associated with the plurality of first interest points and a plurality of second descriptor vectors associated with the plurality of second interest points;

matching, using a feature matching algorithm, based on the plurality of first descriptor vectors associated with the plurality of first interest points and the plurality of second descriptor vectors associated with the plurality of second interest points, at least one first interest point of the plurality of first interest points to at least one second interest point of the plurality of second interest points; and determining, based on the at least one first interest point of the plurality of first interest points matched to at least one second interest point of the plurality of second interest points, position information associated with a three-dimensional position of the object relative to the image capture device.

16. A computer program product comprising at least one non-transitory computer-readable medium including program instructions that, when executed by at least one processor, cause the at least one processor to:

obtain a calibration image including a calibration marker, wherein the calibration image including the calibration marker is captured by an image capture device with the calibration marker located at a known distance from the image capture device, and wherein the calibration marker has a known dimension;

extract one or more features associated with the calibration marker in an image space of the calibration image;

determine, based on the one or more features associated with the calibration marker in the image space of the calibration image, the known distance of the calibration marker from the image capture device, and the known dimension of the calibration marker, one or more calibration parameters;

obtain an image including an object, wherein the image including the object is captured by the image capture device;

extract at least one feature associated with the object in an image space of the image;

obtain a dimension of the object;

determine, based on the at least one feature associated with the object in the image space of the image, the dimension of the object, and the one or more calibration parameters, the distance of the object from the image capture device; and provide the distance of the object from the image capture device, wherein the one or more features associated with the calibration marker in the image space of the calibration image include a pixel dimension of the calibration marker in the image space of the calibration image, and wherein the one or more calibration parameters include an effective focal length associated with the image capture device, wherein the effective focal length is determined according to the following Equation:

$$F = (P \times D) / W$$

where F is the effective focal length, P is the pixel dimension of the calibration marker in the image space of the calibration image, D is the known distance of the calibration marker from the image capture device, and W is the known dimension of the calibration marker.

* * * * *